(12) United States Patent
Li et al.

(10) Patent No.: US 10,531,223 B2
(45) Date of Patent: *Jan. 7, 2020

(54) MATCHING USERS IN A LOCATION-BASED SERVICE

(71) Applicant: Alibaba Group Holding Limited, George Town (KY)

(72) Inventors: Jiajia Li, Hangzhou (CN); Liang Wang, Hangzhou (CN); Letao Wang, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,026

(22) Filed: Nov. 21, 2018

(65) Prior Publication Data

US 2019/0098447 A1    Mar. 28, 2019

Related U.S. Application Data

(63) Continuation of application No. 15/421,335, filed on Jan. 31, 2017, now Pat. No. 10,171,937, which is a
(Continued)

(30) Foreign Application Priority Data

Jun. 24, 2014 (CN) .......................... 2014 1 0287604

(51) Int. Cl.
*H04W 4/021* (2018.01)
*H04W 4/21* (2018.01)
(Continued)

(52) U.S. Cl.
CPC ............ *H04W 4/021* (2013.01); *G06Q 50/01* (2013.01); *H04L 51/32* (2013.01); *H04L 67/16* (2013.01);
(Continued)

(58) Field of Classification Search
CPC ....... H04W 4/021; H04W 4/023; H04W 4/21; H04W 76/11; H04W 8/005; H04W 4/18;
(Continued)

(56) References Cited

U.S. PATENT DOCUMENTS 6,731,940 B1    5/2004 Nagendran
7,190,969 B1    3/2007 Oh
(Continued)

FOREIGN PATENT DOCUMENTS

EP    2312871 B1    5/2012
JP    2006524938 A    11/2006

*Primary Examiner* — Jean A Gelin
(74) *Attorney, Agent, or Firm* — Van Pelt, Yi & James LLP

(57) ABSTRACT

Embodiments of the present application relate to a method, apparatus, and system for matching users in connection with a Location-Based Service. The method includes receiving service messages from a plurality of terminals, wherein the service messages include communication attributes, geographic location information, and user feature identifiers, extracting the communication attributes, the geographic location information, and the user feature identifiers from the received service messages, determining whether two or more of the plurality of terminals are within a threshold range, determining whether the extracted user feature identifiers corresponding to the terminals are the same, and in the event that one or more of the plurality of terminals are within the threshold range and the extracted user feature identifiers are the same, setting a terminal of the one or more terminals as a message receiving terminal if a service message associated with the terminal includes a communication attribute corresponding to receiving.

18 Claims, 15 Drawing Sheets

Related U.S. Application Data continuation of application No. 14/747,281, filed on Jun. 23, 2015, now Pat. No. 9,596,564.

(51) Int. Cl.
| | |
|---|---|
| *H04W 8/00* | (2009.01) |
| *H04L 29/08* | (2006.01) |
| *G06Q 50/00* | (2012.01) |
| *H04W 4/02* | (2018.01) |
| *H04W 76/11* | (2018.01) |
| *H04L 12/58* | (2006.01) |
| *G06Q 20/32* | (2012.01) |

(52) U.S. Cl.
CPC ............ *H04L 67/18* (2013.01); *H04W 4/023* (2013.01); *H04W 4/21* (2018.02); *H04W 8/005* (2013.01); *H04W 76/11* (2018.02); *G06Q 20/3224* (2013.01)

(58) Field of Classification Search
CPC ........ H04W 4/206; H04W 8/24; H04L 51/32; H04L 67/16; H04L 67/18
See application file for complete search history.

(56) References Cited

U.S. PATENT DOCUMENTS

| | | | |
|---|---|---|---|
| 7,983,249 B2 | 7/2011 | Galluzzo | |
| 8,290,469 B2 | 10/2012 | Corem | |
| 8,359,239 B1* | 1/2013 | Cook | G06Q 30/04 |
| | | | 705/16 |
| 8,615,520 B2 | 12/2013 | Fallah | |
| 8,688,148 B2 | 4/2014 | Steenstra | |
| 8,832,121 B2 | 9/2014 | Smith | |
| 9,760,885 B1* | 9/2017 | Ramalingam | H04W 4/029 |
| 2002/0107008 A1 | 8/2002 | Hendrey | |
| 2003/0020623 A1* | 1/2003 | Cao | G01C 21/20 |
| | | | 340/686.6 |
| 2003/0033582 A1 | 2/2003 | Klein | |
| 2005/0228860 A1 | 10/2005 | Hamynen | |
| 2007/0055632 A1 | 3/2007 | Hogl | |
| 2007/0149208 A1 | 6/2007 | Syrbe | |
| 2007/0274240 A1* | 11/2007 | Weidenhaupt | H04L 41/0809 |
| | | | 370/310 |
| 2008/0200155 A1* | 8/2008 | Hasemann | H04W 4/12 |
| | | | 455/414.3 |
| 2009/0012898 A1* | 1/2009 | Sharma | G06Q 20/24 |
| | | | 705/44 |
| 2009/0198666 A1 | 8/2009 | Winston | |
| 2011/0238476 A1* | 9/2011 | Carr | G06Q 30/00 |
| | | | 705/14.25 |
| 2012/0282859 A1 | 11/2012 | Mayer | |
| 2013/0325977 A1 | 12/2013 | Drews | |
| 2014/0053078 A1 | 2/2014 | Kannan | |
| 2014/0066044 A1 | 3/2014 | Ramnani | |
| 2016/0029368 A1* | 1/2016 | Borenstein | H04W 4/02 |
| | | | 709/205 |
| 2018/0227724 A1* | 8/2018 | Bock | A47C 31/00 |

\* cited by examiner

300

| Sender-user identifier A2 | User feature code: A001 | Geographic location information: LON;LAT | Service content: Face-to-face payment | Sending/receiving attribute: PAY: P2P |
|---|---|---|---|---|

MSG_A2

MATCHING USERS IN A LOCATION-BASED SERVICE

CROSS REFERENCE TO OTHER APPLICATIONS

This application is a continuation of co-pending U.S. patent application Ser. No. 15/421,335, entitled MATCHING USERS IN A LOCATION-BASED SERVICE filed Jan. 31, 2017 which is incorporated herein by reference for all purposes, which is a continuation of U.S. patent application Ser. No. 14/747,281, entitled MATCHING USERS IN A LOCATION-BASED SERVICE filed Jun. 23, 2015, now U.S. Pat. No. 9,596,564, which is incorporated herein by reference for all purposes, which claims priority to People's Republic of China Patent Application No. 201410287604.9 entitled AN LBS-BASED USER MATCHING METHOD, MESSAGE CLIENT, SERVER AND SYSTEM, filed Jun. 24, 2014 which is incorporated herein by reference for all purposes.

FIELD OF THE INVENTION

The present application relates to a field of providing web services. In particular, the present application relates to a method, a terminal, a server, and a system for location-based services (LBS) based user matching.

BACKGROUND OF THE INVENTION

As electronic communications technology develops, various kinds of mobile terminals, such as mobile phones, tablet computers, notebook computers, or portable broadcasting equipment, have become popular with the user public. The functions of various mobile terminal devices are becoming increasingly powerful. For example, various mobile terminals can provide users with many kinds of convenient applications such as Location-Based Services (LBS), which can acquire location information (e.g., geographic coordinates or geodetic coordinates) corresponding to mobile terminal users using mobile communication networks (such as Global System for Mobile Communications (GSM), or Code Division Multiple Access (CDMA) networks) of telecom mobile operators or through external positioning methods (such as Global Positioning Service (GPS)) and, with support from the Geographic Information System (GIS), provide services to users according to the acquired location information.

In some related art, the LBS service generally includes an application on a mobile terminal using spatial positioning technology to acquire the current geographic location information of the mobile terminal (e.g., the location of the user), and send the geographic location information of the mobile terminal and a service request to the server side (e.g., the server that provides the LBS service). The server side carries out processing based on the geographic location information of the mobile terminal and information associated with the service request. The server side generally sends the processing results to the appropriate users within a preset geographic service range.

FIG. 1 is a modular structural diagram of a Location-Based Service (LBS) system.

Referring to FIG. 1, an LBS system 100 is provided. The LBS system 100 includes an LBS server 110, and a plurality of mobile terminals (mobile terminal 120, mobile terminal 130, mobile terminal 140, and mobile terminal 150). The LBS server 110 can communicate with one of the plurality of mobile terminals over a communication network. The communication between the LBS server 110 and a mobile terminal can be web-based.

Mobile terminal 120, mobile terminal 130, and mobile terminal 140 can correspond to mobile terminals belonging to the same user group and can be geographically located close to each other. Within a preset geographic service range, users of mobile terminal 120, mobile terminal 130, and mobile terminal 140 can use an application to process a payment from mobile terminal 120 (or mobile terminal 130) to mobile terminal 140. For example, user A1 of mobile terminal 120 or user A2 of mobile terminal 130 can pay user A of mobile terminal 140 using a "face-to-face payment" method (e.g., using an application such as a payment application installed on the corresponding mobile terminals). The mobile terminals of user A1 and user A2 (e.g., the application installed on the mobile terminals) can respectively send to an LBS server side service (e.g., LBS server 110) messages comprising a request to pay user A. The application on mobile terminal 140 of user A can also send to the LBS server 110 a service message comprising a request to receive payment. The service messages sent by the applications on the mobile terminals (e.g., mobile terminal 120, mobile terminal 130, and mobile terminal 140) can include the geographic location information respectively corresponding to the mobile terminals. The LBS server side (e.g., LBS server 110) receives the request-to-pay service messages that were sent by the applications on the mobile terminals of user A1 and user A2. If the geographic locations of the mobile terminals of user A1, user A2, and user A are close to each other, the request-to-pay messages sent by the applications on mobile terminals of user A1 and user A2 can be sent to the mobile terminal of user A. The application of the mobile terminal of user A can complete receipt of payment through interaction with the LBS server side (e.g., LBS server 110).

According to some related art, relatively large discrepancies in the quality (mainly relating to the sensitivity of antennae for receiving or sending signals) of mobile terminal devices exists. In addition, the algorithms used by various mobile terminal applications to calculate user geographic location information can vary. Accordingly, geographic location of mobile terminals (e.g., user geographic location information acquired by mobile terminals) can be inaccurate or inconsistent across different mobile terminals. When the LBS server side receives interfering information from mobile terminals belonging to other user groups within the preset geographic service range, the LBS server side is unable to accurately differentiate the mobile terminals of the different user groups. As a result, the LBS server side cannot accurately match users or correctly process information. For example, in LBS system 100 provided in FIG. 1, while the mobile terminals of user A1 and user A2 are sending request-to-pay service messages to the LBS server side, user D1 belonging to another user group is also communicating with the LBS server side (e.g., LBS server 110). Mobile terminal 150 of user D1 can be using an application to communicate with the LBS in order to make a payment to user D (not shown) using the "face-to-face payment" method in an application. Accordingly, mobile terminal 150 (e.g., an application running on the mobile terminal) of user D1 can send a request-to-pay service message to LBS server 110. Because the geographic location information that mobile terminal 150 of user D acquires for itself is insufficiently accurate, the geographic location contained in the geographic location information acquired by mobile terminal 150 of user D is relatively close to the geographic locations of the mobile terminals of user A1 and user A2.

Upon receiving the request-to-pay service message from mobile terminal 150 of user D1, the LBS server side may be unable to differentiate user D1 from user A1 or user A2 because the geographic locations contained in the geographic location information sent by the applications on the mobile terminals of user A1, user A2, and user D1 are close to each other. As a result, LBS server 110 can send the request-to-pay message of user D1 to user A. Mobile terminal 140 of user A receives the request-to-pay message sent by user D1, resulting in a failure for the LBS matching of users (e.g., the matching of users belonging to corresponding user groups). According to some related art, in the event that the LBS server side receives interfering information from mobile terminals in other user groups within the preset geographic service range, the LBS server side is unable to accurately differentiate the mobile terminals of the different user groups. The LBS server side cannot accurately match users because in a location-based payment scenario, a message sent by one user is not sent to another user directly via a server. Rather, as an example, the server matches two users that had separately sent messages to the serer—a user that is paying another user sends a message to the server indicating an intent to send payment to the other user, and the other user that is an intended recipient of the payment sends a message to the server indicating an intent to accept payment. As an example, the message sent by the paying party does not include account information of the intended recipient of the payment and thus is not matched with the intended recipient using a user identifier. As a result, the accuracy of LBS server-side user matching is diminished. Therefore, according to some related art, the LBS service is not accurately provided to users.

The server that provides conventional LBS services is generally unable to accurately match various users with each other in connection with LBS services. Therefore, there is a need for a method, device, and system for providing more effective LBS services. For example, there is a need for a method, device, and system for providing LBS services that more effectively match users with services.

BRIEF DESCRIPTION OF THE DRAWINGS

Various embodiments of the invention are disclosed in the following detailed description and the accompanying drawings.

In order to provide a clearer explanation of the technical schemes in the prior art or in embodiments of the present application, simple introductions are given below to the drawings which are needed for the embodiments or the prior art. Obviously, the drawings described below are merely some embodiments recorded in the present application. Persons with ordinary skill in the art could, without expending creative effort, obtain other drawings on the basis of these drawings.

DETAILED DESCRIPTION

Figure 1:
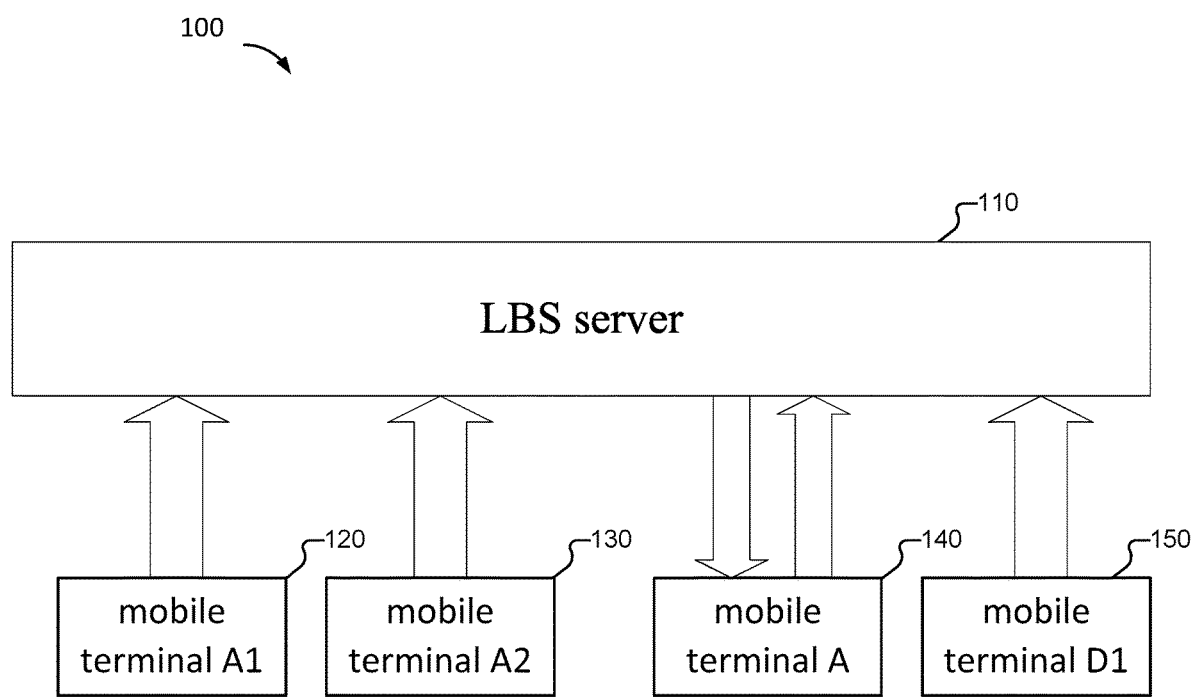
FIG. 1 is a modular structural diagram of a Location-Based Service (LBS) system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a terminal generally refers to a device used (e.g., by a user) within a network system and used to communicate with one or more servers. According to various embodiments of the present disclosure, a terminal may include communication functionality. For example, a terminal may be a smart phone, a tablet computer, a mobile phone, a video phone, an e-book reader, a desktop Personal Computer (PC), a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), or the like.

According to some embodiments of the present disclosure, a terminal includes a smart home appliance with communication functionality. A smart home appliance can be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, or the like.

According to various embodiments of the present disclosure, a terminal can be any combination of the foregoing terminals. In addition, it will be apparent to one having ordinary skill in the art that a terminal according to various embodiments of the present disclosure is not limited to the foregoing terminal.

Various embodiments of the present disclosure include a method, a device (e.g., a terminal), and system for providing LBS services. Some embodiments of the present disclosure include a method, a device, and a system for matching users in connection with providing LBS services.

A server can provide LBS services to client terminals. Users can communicate with (e.g., send service messages to) an LBS server via an application executed on the client terminal. An application executed by a client terminal that sends a message in connection with an LBS service is referred to as the message sending terminal. An application executed on a terminal that receives a message in connection with an LBS service is referred to as a message receiving terminal.

Terminals can generally acquire geographic location information associated with a current location of the terminal. For example, a terminal can include a GPS positioning system that the terminal can use to acquire the geographic location information. As another example, the terminal can acquire the geographic location information via the mobile communication networks of telecom mobile operators. A server associated with the mobile communication network can provide the terminal with the geographic location information of the terminal based on a communication between the terminal and a network device such as based on a signal strength between the terminal and the network device, or another appropriate method for determining a location of a terminal. The geographic location information of a terminal can also be acquired in combination with WiFi hotspot information. In response to the terminal acquiring the geographic location information, the terminal can insert the geographic location information in to a service message and send the service message (e.g., to the LBS server).

The LBS server side is generally located in a computer network. The LBS server side processes server messages through the computer network. The LBS server side generally can send the processing result of a service message via a mobile telecom network to the appropriate terminal. For example, the LBS server side can provide an LBS service to a terminal. The LBS can be provided using a combination of a mobile telecom network and a computer network. The mobile telecom network and the computer network can interact with each other through a gateway. The terminal can send service messages through the mobile telecom network, and the service messages are transmitted via the gateway to the LBS server side. The LBS server side performs processing based on the received service messages and sends the processing results via the gateway to the corresponding terminals.

Figure 2A:
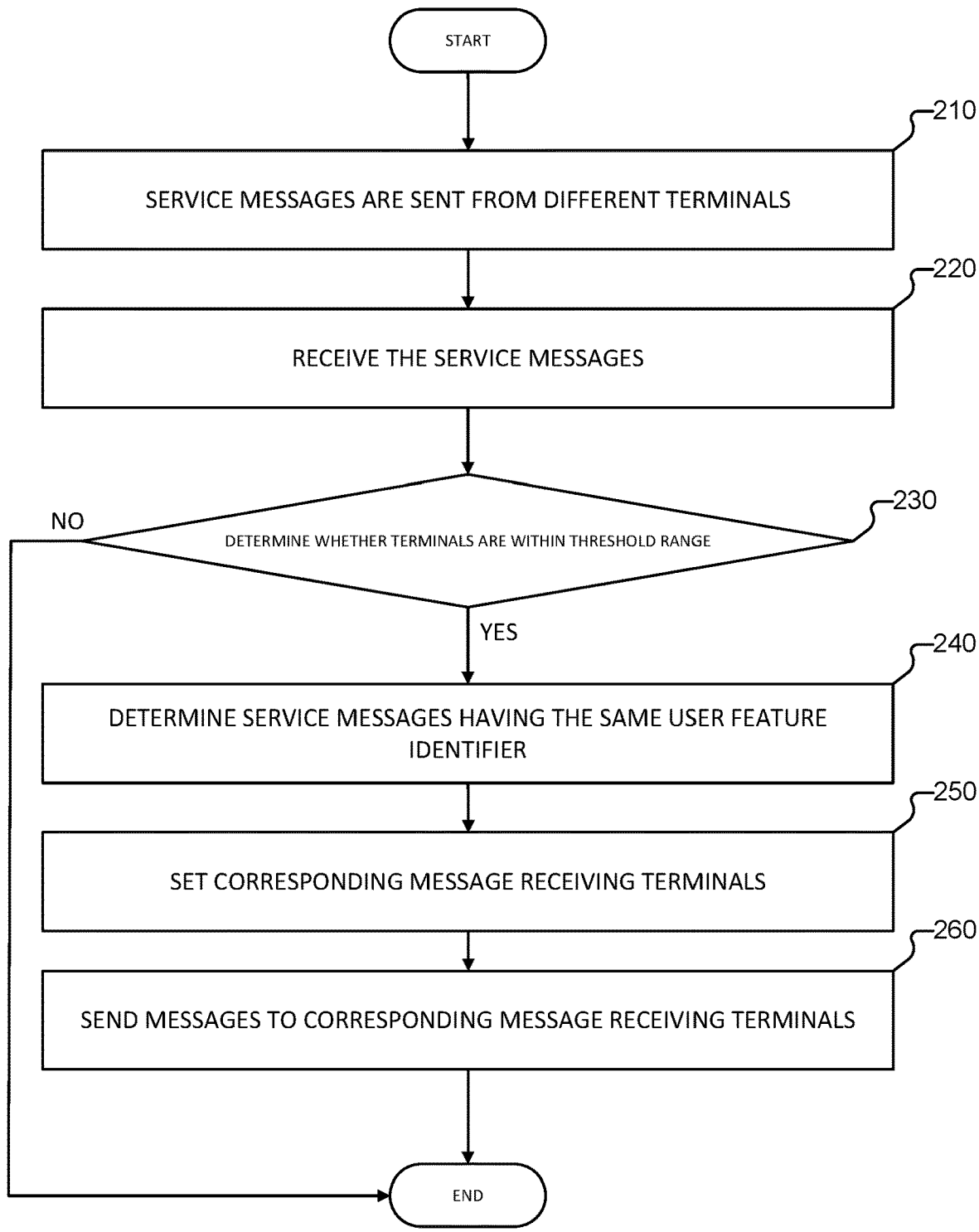
FIG. 2A is a flowchart of a method for LBS-based user matching according to various embodiments of the present application.

FIG. 2A is a flowchart of a method for LBS-based user matching according to various embodiments of the present application.

Referring to FIG. 2A, a process 200 for matching users in connection with LBS is provided. Process 200 can be implemented by a system, such as system 1300 of FIG. 13, which includes a server such as an LBS server. For example, 220-260 of process 200 can be implemented by server 600 of FIG. 6, server 700 of FIG. 7, server 800 of FIG. 8, server 900 of FIG. 9, server 1000 of FIG. 10, server 1100 of FIG. 11, or server 1200 of FIG. 12.

At 210, service messages are sent from different terminals. A service message can include communication attributes (e.g., sending/receiving attributes), geographic location information, and user feature identifiers (e.g., user feature codes). The user feature identifier can be a string comprising letters, numbers, special characters, the like, or any combination thereof. The user feature identifier can be a code agreed upon by a plurality of users or a plurality of terminals. The user feature identifier can be associated with a particular transaction. For example, the user feature identifier can be unique to a transaction among a plurality of users or a plurality of terminals. In some embodiments, the service message further includes a user identifier associated with the user or terminal. A plurality of different terminals respectively send a corresponding plurality of service messages to a server such as an LBS server. The terminals can send the service messages in connection with receiving an LBS service. For example, the service messages can correspond to requests for the corresponding terminals to receive an LBS service from the server. The communication attributes can identify whether the terminal is to send information or receive information in connection with an LBS service associated with the service message.

At 220, the service messages are received. The server receives the service messages that are sent by the various different terminals. In response to receiving the service messages, the server extracts the communication attributes, the geographic location information, and the user feature identifiers from the corresponding service messages. The server can extract other information that can be included in the service messages. For example, the server can extract other messages including specific service content or other preset messages, user identification information, or the like.

At 230, a determination is made as to whether the terminals are within a threshold range of each other. The server can determine whether any two of the terminals that sent the service messages are within the threshold distance of each other by computing the distance between the terminals' coordinates using conventional techniques. The server can identify the terminals within the threshold range of each other. The threshold range can be configurable according to system settings or preferences. For example, the threshold range can be configured according to the type of LBS service provided.

In the event that the terminals are not within the threshold range of each other at 230, process 200 ends.

In the event that the terminals are within the threshold range of each other at 230, at 240, the service messages having the same user feature identifier can be determined. The server can determine (e.g., identify) the service messages from terminals among the terminals within the threshold range of each other that correspond to the same user feature identifier. The server can compare the user feature identifiers included in the service messages received from terminals determined to be within the threshold range of each other in order to identify the server messages having the same user feature identifier.

At 250, message receiving terminals are set. The server can set a group of message receiving terminals according to the determination of the service messages having the same user feature identifiers. For example, the server can determine that the message receiving terminals correspond to the terminals that are within the threshold range of each other and from which the service messages include the same user feature identifier. These terminals are referred to as message receiving terminals because these terminals are identified by the server as terminals that receive information in connection with an LBS service. As an example, in the context of an LBS transaction, a terminal associated with a payer can be identified as a sending terminal and a terminal associated with a payee can be identified as a receiving terminal (e.g., the receiving terminal is identified to receive information from the sending terminal in connection with the LBS service).

In some embodiments, the server can set various groups of message receiving terminals according to whether certain terminals are within a threshold range of each other and whether the service messages received from the certain terminals include the same user identifier.

At 260, messages are sent to the corresponding receiving terminals. The server can send a message to the terminals identified as being within the threshold range of each other and as being associated with service messages that include the same user feature identifier. For example, the server can send a message to the terminals within a corresponding group of terminals. The message can be a response to the service messages received from the corresponding terminals. In some embodiments, the messages are sent in connection with an LBS service. For example, the information included in the messages can include information that provide an LBS service.

Figure 3:
FIG. 3 is a message format diagram of a service message according to various embodiments of the present application.

FIG. 3 is a message format diagram of a service message according to various embodiments of the present application.

Referring to FIG. 3, a service message 300 is provided. Service message 300 can be configured and sent in connection with process 200 of FIG. 2A. As an example, service message 300 is illustrated with fields corresponding to MSG_A2 communicated by user A2.

The service message 300 includes service content, a communication attribute (e.g., sending/receiving attribute), geographic location information, and a user feature identifier (e.g., a user feature code). Other fields can be included.

The message content can be configured by the terminal. For example, the terminal can configure a message content according to an LBS service requested. The terminal can set the message content (e.g., the service content) for a user (e.g., "face-to-face payment," "file transfer," or "spring excursion—shake shake"). Each item of the service content can have a corresponding communication attribute (e.g., a corresponding sending/receiving attribute). For example, if the service content is set to "face-to-face payment," the corresponding communication attribute (e.g., the sending/receiving attribute) is set as "face-to-face payment" or set as a specific code corresponding to "face-to-face payment," such as "PAY: P2P." The terminal can configure the service content as "face-to-face receiving." If the service content is set to "face-to-face receiving," the corresponding communication attribute (e.g., the sending/receiving attribute) is set as "face-to-face receiving" or "REC: P2P."

The user can select the needed service content from the terminal. For example, the terminal can provide a user interface from which the user can select a desired service client. The service content can be set (e.g., selected) by the user according to the particular application executed on the terminal. For example, the service content can be a code representing an action to be performed. In some embodiments, the service content can be selected from among a plurality of options (e.g., different service content) provided by an application executed on the terminal. The service content (e.g., the plurality of different service content from which a service content is selected) can be configured according to an implementation (e.g., a business purpose) of a particular application executed on the terminal. The terminal can receive user-selected service content and insert the communication attribute (e.g., the send/receive attribute) corresponding to the selected service content in the service message. The communication attribute (e.g., the send/receive attribute) of the service message can comprise a field indicating that an attribute of the user-selected service content is either "receiving" or "sending," which indicates whether the corresponding terminal is to receive information in connection with the LBS service or provide information in connection with the LBS service. For example, a terminal associated with a service message having a communication attribute set to "receiving" can receive data or a service (e.g., payment) from a terminal associated with a service message having a communication attribute set to "sending." The communication attribute can be represented using strings or flags. For example, in the event that User A is using a terminal (e.g., via an LBS) to pay User B, User A can select "pay other party" in the "face-to-face payment" service content. User A can use the terminal of User A to set the service content to "pay other party." In response to the service content being set to "pay other party," the terminal can insert the communication attribute (e.g., the sending/receiving attribute) (PAY: P2P) corresponding to the user-selected "face-to-face payment" service content in the service message. User B can use the terminal of User B to receive payment from User A and can select "receive payment from the other party" in the "face-to-face payment" service content. User B can use the terminal B to set the service content to "receive payment from the other party." In response to the service content being set to "receive payment from other party," the terminal can insert the communication attribute (e.g., the sending/receiving attribute) (REC: P2P) corresponding to the user-selected "face-to-face payment" service content in the service message. The communication attributes (e.g., sending/receiving attributes) corresponding to "PAY: P2P" and "REC: P2P" include the field "P2P." The "P2P" field can indicate "face-to-face payment" service content. The "PAY" field included in the communication attribute corresponding to "PAY: P2P" can indicate that the communication attribute (e.g., the sending/receiving attribute) of the "face-to-face payment" service content is "sending." The "REC" field included in the communication attribute corresponding to "REC: P2P" can indicate that the communication attribute (e.g., the sending/receiving attribute) of the "face-to-face payment" service content is "receiving."

In some embodiments, the plurality of users or terminals intending to use a LBS service to communicate or interact with each other configure the corresponding service messages to include an indication of a type of interaction that the user terminal has in relation to the LB S service (e.g., whether the terminal is a sending terminal or a receiving terminal), and an indication of another user or another terminal associated with the LBS service. For example, in the event that the terminal configuring a service message is a sending terminal, then the service message will include an indication that the terminal is a sending terminal, and an indication of the intended recipient.

In some embodiments, the server associated with an LBS service stores an indication of a plurality of users or a plurality of terminals that will interact with one another using the LBS service. As a result, the corresponding service messages sent by a user or a terminal includes an indication of a type of interaction that the user terminal has in relation to the LBS service (e.g., whether the terminal is a sending terminal or a receiving terminal). However, in this implementation, the service message is not required to include an indication of the other user or other terminal associated with a transaction because the LBS stores such an indication. The indication can be stored in association with a particular user or terminal and a particular type of transaction (e.g., a particular user feature identifier).

The sent service message can include a user identifier used to differentiate between different users. The user identifier can identify the user using, or logged into, the terminal that communicates the service message. For example, user identifiers A, B and C can be used to differentiate users on different terminals. The terminal can store multiple different users. A terminal can be used in connection with multiple different user identifiers according to which user is logged in or otherwise using the terminal. The terminal can use the user identifiers to differentiate the service messages corresponding to different users on the same terminal.

The service messages sent by the terminals generally include geographic location information respectively corresponding to the terminals. The geographic location information corresponding to a terminal can be acquired using the appropriate function modules on the terminals. For example, the geographic location information corresponding to a terminal can be acquired through a GPS module on the terminal or obtained by querying the mobile telecommunications network of the telecom mobile operator to which the terminal is connected, or otherwise located. The geographic location information corresponding to a terminal can also be acquired using WiFi hotspot information. For example, each piece of WiFi hotspot information generally includes detailed geographic location information associated with the WiFi hotspot. The terminal can acquire the geographic location information for the current WiFi hotspot in connection with the terminal connecting to the WiFi hotspot. The terminal can regard the geographic location information associated with the WiFi hotspot to which the terminal is currently connected as the current geographic location information of the terminal. In some embodiments, the geographic location information corresponding to a terminal can be acquired through a combination of geolocation methods.

The service message can include a user feature identifier (e.g., a user feature code). In some embodiments, the user feature identifier is defined and set by the user. A terminal can acquire a self-defined user feature identifier input by the user. For example, a user can input a user feature identifier to an interface provided by the terminal, such as a screen with an input box that is provided as a part of the application employing the LBS. In some embodiments, the user feature identifier can be the same user feature identifier set up in advance in the event that the users in the same user group select service content in the terminal. The user feature identifier can be symbols, letters, numbers, Chinese characters, or any combination thereof. For example, User A1 can set a corresponding user feature identifier as "A001." User B can set a corresponding user feature identifier as "B001." (The actual identifiers used here are for purposes of illustration and can be different in practice.) In some embodiments, the user feature identifier is self-defined and set by multiple users who are geographically close and who are familiar with each other. For example, a group of users can collectively set a user feature identifier. The group of users can collectively set a unique user feature identifier to be used in connection with a service. For example, users A1, A2, A3, A4, B1, B2, and B3 are geographically close to each other. Users A2, A3, and A4 are to pay A1. Users B2 and B3 are to pay B1. Accordingly, the users A1, A2, A3, and A4 can jointly set the user feature identifier "A001," and users B1, B2, and B3 can jointly set the user feature identifier "B001." Each user can use the appropriate user feature identifier (e.g., the user feature identifier corresponding to the intended group associated with the service messages). The service messages separately sent by the terminals of users A1, A2, A3, A4, B1, B2, and B3 to the server can comprise user feature codes set by each of the users independently (e.g., the service messages respectively sent by users A1, A2, A3, and A4 can include a user feature identifier set to "A001," and the service messages respectively sent by users B1, B2, and B3 can include a user feature identifier set to "B001"). For example request-to-pay service messages MSG_A2, MSG_A3, and MSG_A4 respectively sent by the terminals of payers (users) A2, A3, and A4 include the user feature identifier "A001." Similarly, the request-to-pay service messages MSG_B2 and MSG_B3 respectively sent by the terminals of payers (users) B2 and B3 include the user feature identifier "B001." The terminal of payee (user) A1 can send the receive payment service message MSG_A1 and set the user feature identifier included therein as "A001." The terminal of payee B1 can send the receive payment service message MSG_B1 and set the user feature identifier included therein as "B001."

The various different terminals separately send service messages to the server side (comprising one or more servers configured to provide the desired service to the terminals). The service message sent to the server side by a terminal can include the communication attribute (e.g., the sending/receiving attributes), geographic location information, and a user feature identifier.

In some embodiments, 230 and 240 of process 200 can be combined. For example, the server on the basis of extracted geographic location information, determines whether the terminals are within the threshold range and compares the user feature identifiers respectively extracted from corresponding service messages to determine whether or not the user feature identifiers are the same.

In response to the server side (e.g., the LBS server) receiving the service messages, the server side can extract user feature identifiers from the service messages and compare the extracted user feature identifiers to determine whether or not the user feature identifiers are the same. The server side can classify the received service messages according to whether the terminals are within the threshold range or whether the user feature identifiers of the service messages are the same. For example, the server side can classify the service messages having the same extracted user feature identifiers as the same category (e.g., the server side can group the service messages having the same user feature identifiers or the corresponding terminals from which the service messages are received). The server side can store classified service messages. For example, the server side can store the associations between classifications and the service messages. The server side can store a database storing a mapping of classifications to service messages. The classification of a service message can be an identifier such as an identifier that identifies a group of services messages to which a particular service message belongs. The server side receives the request-to-pay service messages MSG_A2, MSG_A3, MSG_A4, MSG_B2, and MSG_B3 respectively sent by the terminals of users A2, A3, A4, B2, and B3, and the server side can extract the user feature identifiers from the said service messages. Referring to the example above, the user feature identifiers of the service messages extracted by the server side from service messages sent by the terminals of users A2, A3, and A4 are the same: "A001." Similarly, the user feature identifiers of the service messages extracted by the server side from service messages sent by the terminals of users B2 and B3 are the same: "B001." The server side categorizes (or classifies) the service messages having extracted user feature identifiers that are the same. For example, the server side classifies the service messages MSG_A2, MSG_A3, and MSG_A4 with the user feature code "A001" as one category and classifies the service messages MSG_B2 and MSG_B3 as another category. If the server side also receives request-to-receive-payment service messages MSG_A1 and MSG_B1 respectively sent by the terminals of payees (users) A1 and B1 and extracts the user feature identifiers from the service messages, the corresponding user feature identifiers will be "A001" and "B001," respectively. The server side can assign the service message MSG_A1 of payee A1 and the service messages MSG_A2, MSG_A3, and MSG_A4, all of which have the feature identifier "A001," as the same category for storage, and the server side can assign the service message of payee B1 and the service messages MSG_B2 and MSG_B3, all of which have the feature identifier "B001," as the same category for storage. The server side can regard service messages having the same user feature identifier as service messages from users in the same user group.

After the server side receives the service messages, the server side can extract geographic location information from the service messages use the geographic location information to determine whether different terminals are within the threshold range. For example, the server side can use the extracted geographic location information (e.g., coordinates) to determine whether the geographic location differences between different terminals (e.g., the distances between sets of coordinates, the differences between sets of coordinates, or other appropriate measurements) are greater than a predetermined value set at the server side. The predetermined value can correspond to the threshold range. In some embodiments, the predetermined value can be set according to the type of service provided by the server side. If the geographic location differences between different terminals are not greater than the predetermined value, then the geographic location information is within the threshold range.

Figure 2B:
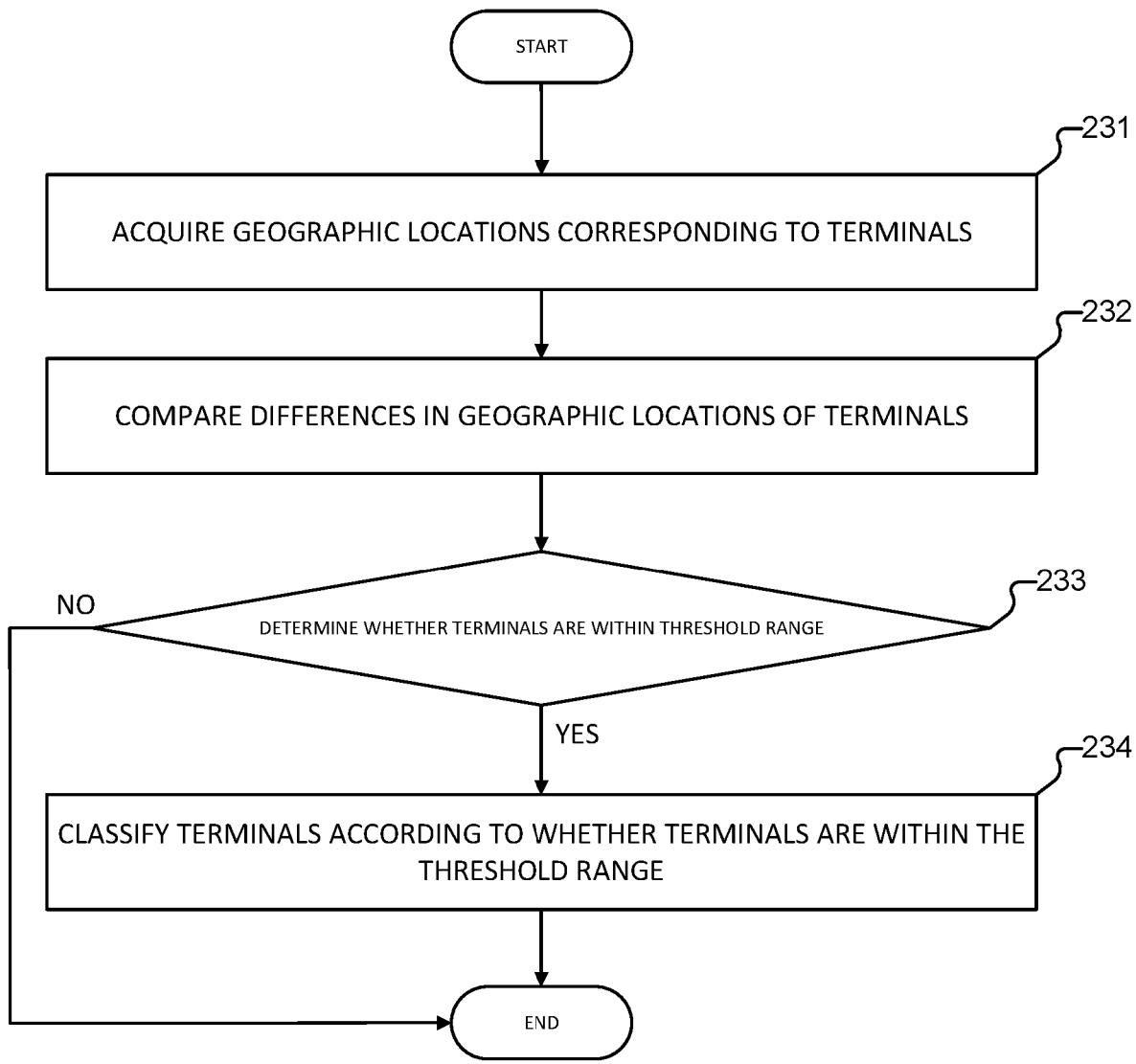
FIG. 2B is a flowchart of a method for LBS-based user matching according to various embodiments of the present application.

FIG. 2B is a flowchart of a method for LBS-based user matching according to various embodiments of the present application.

Referring to FIG. 2B, a process 230 for determining whether terminals are within a threshold range is provided. Process 230 can be implemented by a system, such as system 1300 of FIG. 13, which includes a server such as an LBS server. For example, process 230 can be implemented by server 600 of FIG. 6, server 700 of FIG. 7, server 800 of FIG. 8, server 900 of FIG. 9, server 1000 of FIG. 10, server 1100 of FIG. 11, or server 1200 of FIG. 12. In some embodiments, process 230 can implement 230 of process 200 of FIG. 2A.

At 231, the server side acquires geographic locations corresponding to terminals. The server can acquire the geographic locations of the corresponding terminals based at least in part on the geographic location information included in the corresponding service messages.

A terminal can acquire geographic location information corresponding to the terminal and insert the geographic location information in the service messages. The server side (e.g., the LBS server) can extract geographic location information from the service messages and acquire the geographic locations of the corresponding terminals.

At 232, the server side compares the differences in the geographic locations of terminals to determine whether the differences in the geographic locations are greater than a predetermined value. The predetermined value can be set in the server. In some embodiments, the predetermined value is determined according to the threshold range.

In some embodiments, an LBS is a service based on limited geographic locations (e.g., the LBS is restricted to certain jurisdictions). Therefore, the server side can set a predetermined value for the maximum geographic location difference for the terminals. For example, the predetermined value can be 20 meters, which could indicate that the greatest distance between LBS-requesting terminals is not to exceed 20 meters (e.g., in order for the LBS to be provided).

At 233, the server side determines whether the terminals are within the threshold range. For example, the server side uses the comparison results (e.g., the comparison differences computed at 232), as a basis for determining whether the terminals are within a threshold range.

The server side uses the comparison results as a basis for determining whether the terminals are within a threshold range. For example, the request-to-pay service messages sent by the message sender terminals A, B, and C comprise the latitude and longitude geographic location information of terminals A, B, and C. The predetermined value set at the server side is 20 meters. In the event that the server side extracts the latitude and longitude information of terminals A, B, and C, the terminals can obtain the distances between terminals A, B and C. As an example, the distance calculated between terminals A and B is 15 meters, which is not greater than the predetermined value of 20 meters. Terminals A and B can thus be regarded as being within the threshold range. Conversely, the server side can determine a distance of 2,000 meters for terminals B and C, which would be greater than the predetermined value of 20 meters. Terminals B and C can thus be regarded as not being within the threshold range. If the distance acquired for terminals A and C is also 2,000 meters, the server side regards terminals A and C as not being within the threshold range. Furthermore, the server side can consider the user corresponding to terminal C and the user corresponding to terminal A or B as not belonging to the same user group. The users corresponding to terminals A and B are within a predetermined geographic service range and belong to the same user group. The server side can preset an appropriate way of handling those service messages received by the server side whose geographic location does not belong within the threshold range (e.g., within the p threshold preset range of another terminal).

The predetermined value can be the geographic location distance between terminals. For example, the predetermined value can be the geographic location range relative to a terminal. In some embodiments, the server side may regard a fixed zone that was delimited in advance as the threshold range. The server side can use the extracted geographic location information corresponding to terminals as a basis for determining whether the geographic locations corresponding to the terminals belong to the fixed zone delimited in advance. If the server side determines that the extracted geographic location information corresponding to terminals belongs to the fixed zone, then the geographic location information is within the threshold range. For example, the server side can regard terminals having corresponding geographic locations that are within the zone of longitude 120.6000 degrees to 120.6500 degrees and latitude 31.3000 degrees to 31.3200 degrees as terminals within the threshold range. Various methods for delimiting a fixed zone as the threshold range can be used. For example, different administrative zones of a city can be divided into four threshold ranges A, B, C, and D. The terminals of users A1, A2, and A3 located within the threshold range A can send service messages that include "Spring excursion—Shake shake" service content. The terminal of user D1 located within the threshold range D can send a message that includes "Spring excursion—Shake shake" service content. In the event that the server side receives services messages from the terminals of users A1, A2, A3, and D1, the server side can extract geographic location information from the corresponding service messages and acquire the geographic locations of the terminals of users A1, A2, A3, and D1. The server side can determine that the terminal of user D1 and the terminals of users A1, A2, and A3 are in different threshold ranges. Thus, even if the terminal of user D1 is geographically close to the terminals of users A1, A2, and A3, the terminal of user D1 and the terminals of users A1, A2, and A3 can be outside a threshold range because the terminals respectively belong to different zones that were delimited in advance.

At 234, terminals are classified according to whether the terminals are within the threshold range. The server can identify the terminals that are within the range. In some embodiments, the server can set an identifier or other classification according to whether the terminals are within the threshold range. In some embodiments, 234 is optional in process 230. In some embodiments, classification of the terminals according to whether the terminals are within range can be performed in process 200.

The server side can define message receiving terminals as corresponding to those terminals associated with service messages that are among the service messages whose geographic location information is within a threshold range and whose extracted user feature identifiers are the same, and have communication attributes (e.g., sending/receiving attributes) that are "receiving."

The server side can classify those terminals which, among the terminals having corresponding geographic location information that is within a threshold range and that are associated with extracted user feature identifiers that are the same, have communication attributes (e.g., sending/receiving attributes) that are "receiving" and set those terminals as message receiving terminals. In some embodiments, the communication attributes (e.g., the sending/receiving attributes) of the service messages include a field indicating whether the user-selected service content is "receiving" or "sending." The server side can classify those terminals which, among the terminals that are within a threshold range and that have extracted user feature identifiers that are the same, have communication attributes (e.g., the sending/receiving attributes) that are set as "receiving" and set those terminals as message receiving terminals. For example, the server side respectively receives request-to-pay service messages MSG_A2, MSG_A3, MSG_A4, MSG_B2, and MSG_B3 from the terminals of payer users A2, A3, A4, B2, and B3, respectively. The communication attributes (e.g., the sending/receiving attributes) set therein are "receiving." The server side can receive request-to-receive-payment service messages MSG_A1 and MSG_B1 sent by the terminals of payees A1 and B1. The communication attributes (e.g., the sending/receiving attributes) set therein are "sending." The server side extracts geographic location information from the service messages and acquires the geographic locations of the corresponding terminals. The terminals of users A1, A2, A3, A4, and B2 are geographically close to each other. For example, assume that the terminals of users A1, A2, A3, A4, and B2 are within the predetermined value of 20 meters. The terminals of users B1, B2, and B3 are geographically close to each other. Similarly, assume that the terminals of users B1, B2, and B3 are within the predetermined value of 20 meters. The server side extracts user feature codes from the service messages. The user feature codes extracted from MSG_A1, MSG_A2, MSG_A3, and MSG_A4 can be the same: "A001." The user feature codes extracted from MSG_B1, MSG_B2, and MSG_B3 can be the same: "B001." Thus, the server side can use user feature codes as a basis for classifying received service messages. Service messages MSG_A1, MSG_A2, MSG_A3, and MSG_A4 are classified as one category, and service messages MSG_B1, MSG_B2, and MSG_B3 are classified as another category. From among service messages having user feature code of "A001," the server side can use the terminal of user A1, which among MSG_A1, MSG_A2, MSG_A3, and MSG_A4 is the one that has a communication attribute (e.g., sending/receiving attribute) of "receiving," and set the terminal of user A1 as a message receiving terminal. From among service messages having user feature code of "B001," the server side can use the terminal of user B1, which among MSG_B1, MSG_B2, and MSG_B3 is the one with a communication attribute (e.g., sending/receiving attribute) of "receiving," and set the terminal of user B1 as a message receiving terminal.

The server side sets the message receiving terminals as those terminals corresponding to service messages that are among the service messages having a geographic location information within a threshold range and having an extracted user feature identifier that is the same, and that have communication attributes (e.g., sending/receiving attributes) that are "receiving." The server side sets a terminal as a message receiving terminal according to whether a geographic location of the terminal is within a threshold range.

In the event that the server side classifies the terminals, the server side can store the classification and send information relating to the classification to the terminals (e.g., the terminals being classified). For example, the server side sets up the message receiving terminals, and sends list information on service messages or on message sending terminals to the message receiving terminals. Therefore, said method may further comprise:

Referring back to process 200 of FIG. 2A, at 260, the server sends messages to terminals. For example, the server side can send, to the message receiving terminals, information relating to those service messages that are among the service messages having geographic location information that is within a threshold range and having extracted user feature identifiers that are the same, and that have communication attributes (e.g., sending/receiving attributes) that correspond to "sending." For example, the server side sends information associated with service messages for which the communication attributes are set to sending to terminals classified as message receiving terminals.

The server side can generate a list comprising an indication of the terminals corresponding to those service messages that are among the service messages having a geographic location information that is within a threshold range and having extracted user feature identifiers that are the same, and that have communication attributes (e.g., sending/receiving attributes) that correspond to "sending." The server side can send the list to the message receiving terminals.

In the event that the server side classifies (e.g., and sets up) message receiving terminals, the server side sends, to the terminals classified as message sending terminals, an indication of the terminals classified as message receiving terminals. For example, in response to identifying (e.g., classifying) the terminals corresponding to message receiving terminals, the server side sends an indication of the terminals classified as message receiving terminals to terminals corresponding to service messages that are among the service messages that have a geographic location information that is within a threshold range and that have extracted user feature identifiers that are the same, and that have communication attributes (e.g., sending/receiving attributes) that correspond to "sending."

In some embodiments, the server side generates a list of terminals. The list of terminals can correspond to a list of service messages received by the server from different message sending terminals. The list of terminals can correspond to a list of names of users corresponding to the different message sending terminals. For example, the server side can send a list of the service messages MSG_A2, MSG_A3, and MSG_A4, which includes requests to pay, to the message receiving terminal of user A1 that includes a request to receive payment. The payee A1 receives a list of request-to-pay service messages of the payer users A2, A3, and A4. The requests to pay can be confirmed as having been sent from users of the same user group. Thereupon, the payee A1 can interact with the server side to complete the "face-to-face payment" business service. The server side can also directly send a list of users A2, A3, and A4 corresponding to service messages MSG_A2, MSG_A3, and MSG_A4 to the message receiving terminal. The server side can manage a list of message receiving terminals. For example, a list of message receiving terminals can be processed by the server side according to terminal service requests. For example, the server side can use service messages of users A2, A3, and A4 that include requests to pay to generate a payment message list that includes users A2, A3, and A4. The server side can send the payment message list to the identified (e.g., set up) message receiving terminal (e.g., the terminal of user A1 which has a request to receive payment).

The terminal can receive a list of the terminals identified, or otherwise classified, as message sending terminals. For example, the terminal can receive a list of terminals corresponding to service messages that were received by the server side and that are among the service messages that have geographic location information within a threshold range and that have extracted user feature identifiers that are the same, and that have communication attributes (e.g., sending/receiving attributes) that correspond to "sending." As another example, the terminal can receive, from the server side, service messages that are among the service messages that have geographic location information that is within a threshold range and that have extracted user feature identifiers that are the same, and that have communication attributes (e.g., sending/receiving attributes) that correspond to "sending."

In some embodiments, a method of LBS-based user matching includes the sending of service messages by terminals. The service messages comprise the user feature identifier set by users belonging to the same user group. In response to the server side receiving the service messages, the server side can differentiate different user groups according to user feature identifiers and according to geographic location information. In the event that the server side receives interfering service information sent by users of another user group that are geographically close, the server side can match the correct message receiving terminals. For example, because the server side uses the user feature identifier included in a service message as a basis for differentiating between different user groups, the server side can differentiate users of terminals that belong to different user groups and that are geographically close. Accordingly, the accuracy of server-side user matching is improved.

In some embodiments, the users to be matched by the server side are generally related to each other (e.g., have relevance to each other). For example, the payer users in the same user group expect to be matched with a specific payee user. In some embodiments, users to be matched by the server side are matched randomly with each other, and the user feature identifier can be a business service attribute set in the service messages. In some embodiments, the business service attribute is included as a subfield of the service content. The business service attribute can be used (e.g., by a server associated with an LBS service) to identify a particular service or function associated with the service message. The server associated with the LBS service can use identity of the various users or terminals and an indication of the particular service in order to provide the service to the various users or terminals (e.g., to send corresponding data or services to the appropriate users). An implementation in which the users are randomly matched by the server side is an LBS-based application of the social networking field between strangers. In the event that a user uses an application on a mobile terminal to search for friends in the vicinity, the server side can match users with the same service need and exclude users with different service needs.

In some embodiments, at 210, a first terminal sends a first service message and a second terminal sends a second service message. The first service message includes the business service attributes and geographic location information of the first terminal. The second service message includes the business service attributes and geographic location information of the second terminal.

The different terminals (e.g., the first terminal and the second terminal) separately send service messages, and the service messages include business service attributes and geographic location information. In some embodiments, the business service attributes are service content selected by users of the terminals. For example, a user selects the service content "Dinner party" using a terminal. The terminal can acquire the business service attribute "Dinner party" corresponding to "Dinner party" or a preset specific code corresponding to "Dinner party," such as "DP" or "Dinner-Party." In some embodiments, the service message includes geographic location information.

In some embodiments, at 220, the server side receives the first service message and the second service message. In response to receiving the first service message and the second service message, the server side extracts the business service attributes and the geographic location information from the received first service message and second service message.

In some embodiments, at 230 and 240, the server side determines, on the basis of the extracted business service attributes and geographic location information of the first terminal and the second terminal, whether the geographic locations of the first terminal and the second terminal are within a threshold range and compares the business service attributes of the first terminal and the second terminal to determine whether the business service attributes are the same.

In some embodiments, at 250, in the event that the geographic locations of the first terminal and the second terminal are both within a threshold range and the business service attributes are the same, the server side classifies (e.g., sets up) the first terminal and the second terminal as the same sub-group. The server side can identify the first terminal and the second terminal as belonging to the same user group based on the geographic information and the business service attributes included in the service messages respectively sent by the first terminal and the second terminal.

In the event that server side classifies (e.g., sets up) the first terminal and the second terminal as the same sub-group, the server side can further generate (e.g., set up) a list of terminals classified (e.g., set up) as the same sub-group and send the list to the first terminal or the second terminal. In some embodiments, the terminal sends the message sent by the first terminal classified (e.g., set up) as the same sub-group to the second terminal in the same sub-group. In some embodiments, the first terminal receives a list from the server side of terminals associated with geographic location information that is within a threshold range and that have extracted business service attributes that are the same as the business service attributes of the first terminal. In some embodiments, the first terminal receives a message from the server side that was associated with the messages sent by terminals having a geographic location information that is within a threshold range and that have extracted business service attributes that are the same as the business service attributes of the first terminal.

In some embodiments, the business service attributes included in the service messages are user-defined business service attributes acquired by terminals. The server side can configure or update a database storing mappings between business service attributes and predetermined feature identifiers. In some embodiments, the server side compares the business service attributes of the first terminal and the second terminal and determines whether the business service attributes are the same by querying the database storing the mappings between business service attributes and predetermined feature identifiers to obtain predetermined feature identifiers corresponding to the extracted business service attributes of the first terminal and the second terminal, and to determine whether the predetermined feature identifiers of the first terminal and the second terminal are the same by comparing the business service attributes of the messages received from the first terminal and the second terminal. In the event that the geographic locations of the first terminal and the second terminal are within a threshold range and the predetermined feature identifiers are the same, the server side classifies (e.g., sets up) the first terminal and the second terminal as the same sub-group.

Service messages can be sent from different terminals.

In some embodiments, different terminals send service messages. The service messages include business service attributes and geographic location information of the terminals corresponding to the service messages.

The server side can receive the service messages that were sent by the different terminals and that include business service attributes and geographic location information.

In the event that the server side receives the service messages, the server side extracts business service attributes and geographic location information from the service messages sent from the different terminals.

The server side can determine whether the geographic locations of the different terminals are within the threshold range. The server side determines whether the geographic locations of the terminals are within the threshold range based on the geographic location information of the extracted different terminals. The server side can compare the extracted business service attributes of different terminals to determine whether the extracted business service attributes are the same.

The server side configures groups of terminals according to geographic locations being within a threshold range and whether corresponding business service attributes are the same. For example, the server side can classify terminals within the same sub-group in the event that the geographic locations of the terminals are within a threshold range and that they have the same business service attributes.

The business service attributes of user-selected service content can correspond to user feature identifiers. Users that have the same service need and are within the threshold range can be matched together. Assume users A1, A2, A3, B1, B2, B3, C1, and C2 belong to a threshold range. For example, A1, A2, and A3 need to find companions nearby to eat a meal together. Users A1, A2, and A3 can send service messages that include the service content information "Eat together" through their respective terminals to the server side. As another example, users B1, B2, and B3 need to find companions nearby to sing songs together. Users B1, B2, and B3 can send service messages that include the service content information "Sing together" through their terminals to the server side. As a further example, users C1 and C2 need to find companions nearby to go on an autumn trip together. Users C1 and C2 can send service messages that include the service content information "Sightsee together" through their terminals to the server side. The users can directly select preset service content using the users' respective terminals. The terminals can regard the business service attributes corresponding to service content selected by different users as the user feature identifiers and send service messages comprising the business service attributes and geographic location information to the server side. In response to the server side receiving the service messages sent by the terminals of users A1, A2, A3, B1, B2, B3, C1, and C2, the server side can use the geographic location information in the service messages as a basis for determining that the terminals of users A1, A2, A3, B1, B2, B3, C1, and C2 are within a threshold range. The server side extracts business service attributes from the service messages and determines that the business service attributes of users A1, A2, and A3 are the same (all correspond to "Eat together"), that the business service attributes of users B1, B2, and B3 are the same (all correspond to "Sing together"), and that the business service attributes of users C1 and C2 are the same (both correspond to "Sightsee together"). The server sends the received service messages to the terminals associated with geographic location information that is within a threshold range and extracted business service attributes that are the same. For example, in the case of user A1 searching nearby for the business service attribute "Eat together," the server side can receive service messages from users A2 and A3 who likewise have sent service messages searching nearby for "Eat together." The server side extracts the business service attributes and geographic location information from the service messages of users A1, A2, and A3 and can determine that the terminals of users A1, A2, and A3 are within a threshold range and that the extracted business service attributes are the same (all are "Eat together"). Accordingly, the server side classifies (e.g., matches) the terminals of users A1, A2, and A3 as the same sub-group. The server side configures the matched users A1, A2, and A3 as the same sub-group. Furthermore, the server side can also send the message sent by the terminal configured in the same sub-group to terminals in the same sub-group. Specifically, the server side can establish a joint information group for users A1, A2, and A3 of the same sub-group, and can also set a group identifier (ID). The server side can send the information of the group to the terminals of users A1, A2, and A3. For example, the server side can send information associated with a group to which a user belongs to one or more users in the group. Users A1, A2, and A3 may conduct information exchanges within a shared information group. In the information group, the server side can send the service messages of users A2 and A3 to the message receiving terminal of user A1. Likewise, in the information cluster, the server side can send the service messages of users A1 and A2 to the message receiving terminal of user A3, or the server side can send the service messages of users A1 and A3 to the message receiving terminal of user A2.

In some embodiments, users can send self-defined business service attributes. The users can configure the messages to include the self-defined business service attributes. The terminal can acquire the user-defined business service attributes. For example, the terminal can provide an interface to which a user can input the user-defined service attributes. The business service attributes included in the service messages can be user-defined business service attributes acquired by the terminals. The self-defined business service attributes can be service content information input by users in the form of text or audio and acquired by terminals. If the self-defined business service attributes are speech information (e.g., if the self-defined business service attributes are input via a microphone), then the speech information can be converted to text information using speech recognition technology. The conversion of the speech information to text information can be performed by the terminal or by the server side. In response to the self-defined business service attributes being input to the terminal, the terminal can insert the self-defined business service attributes as the user feature identifiers in the service messages and send the service messages.

In some embodiments, the service content needed by different users is the same or similar, however, the service content information input into the terminals can differ. The server side can store, or otherwise be connected to, a database (e.g., a table) storing mappings between user-defined business service attributes and predetermined feature identifiers. The server side can configure or update the database storing the mappings between the user-defined business service attributes and the predetermined feature identifiers. The server side can compare the business service attributes of the first terminal and the second terminal to determine whether the business service attributes are the same. The server side can compare the business service attributes by querying the database storing mappings of the user-defined business service attributes and the predetermined feature identifiers to obtain predetermined feature identifiers corresponding to the extracted business service attributes of the first terminal and the second terminal. Thereafter, the server side compares the predetermined feature identifiers of the first terminal and the second terminal to determine whether the predetermined feature identifiers are the same. In the event that the geographic locations of the first terminal and the second terminal are both within a threshold range and that the predetermined feature identifiers are the same, the server side sends the first service message to the second terminal.

Table 1 illustrates mappings of user defined service attributes and predetermined feature identifiers. For example, for the database shown in Table 1, the user A-defined business service attribute extracted by the server side is "Go sing together." The extracted user B-defined business service attribute is "Look for people to go sing." The extracted user C-defined business service attribute is "KTV." The server side can associate user-defined business service attributes "Go sing together," "Look for people to go sing," and "KTV" with the predetermined feature identifier "Sing." Accordingly, the server side can regard the service messages of the users A, B and C as service messages of the same user feature identifier.

TABLE 1

Feature Code Correspondence Bank

| User-defined business service attributes | Predetermined feature identifier |
| --- | --- |
| Go sing together | Sing |
| Look for people to go sing | |
| KTV | |
| . . . | |
| Excursion | Sightseeing |
| Hiking | |
| Picnic barbecue | |
| . . . | |

In some embodiments, the server side configures (e.g., classifies) a user group for the terminals of the same sub-group that were matched. The members of the user group can comprise the terminals in the same sub-group that were matched. The server side can send messages sent by the terminals belonging to the same user group to terminals in the same user group. For example, the server side regards users B1, B2, and B3 who, in a service zone D, wish to go sing as the same sub-group. The server side can establish a user group for the matched users B1, B2, and B3. The users B1, B2, and B3 exchange messages within the established user group. For example, user B1 can directly communicate with user B2 or B3 in the user group.

The server side configures a group name for the user group. The group name can be determined according to the business service attributes in the service messages or a predetermined feature identifier stored in the database storing mappings of the user-defined business service attributes and the predetermined feature identifiers. For example, all the service requests of users B1, B2, and B3 in the same user group are to go and sing. The business service attribute in the sent service messages is "Sing." In the event that the server side matches users and establishes a user group for the users B1, B2, and B3, the server side can use the business service attribute "Sing" included in the service messages as the group name of the user group. As another example, the business service attributes of users B1, B2, and B3 can be "Go singing," "Look for people to sing together," and "Go KTV." The feature identifier corresponding to the business service attributes of users B1, B2, and B3 can be stored as "Sing" for all of users B1, B2, and B3 in the database storing mappings of the user-defined business service attributes and the predetermined feature identifiers. The server side can use the predetermined feature identifier "Sing" as the group name of the established user group.

The feature identifier corresponding to the service attribute can be a string of letters, numbers, special characters, the like, or any combination thereof.

In some embodiments, the feature identifier corresponding to the service attribute can be an integer or string that is used in connection with mappings of identifiers to actions/services. For example, a server associated with an LBS service (e.g., the server side) can store a mapping of feature identifiers and services. In response to receiving a service message, the server side can query the mappings of feature identifiers to determine a service to provide.

In some embodiments, the server side can use the geographic location information and the business service attributes/predetermined feature identifiers of terminals of the same sub-group as a basis for determining information associated with the corresponding service provider and for sending information on the service provider to the terminals in the same sub-group. The information associated with the service provider can include address information, contact information, a list of provided services or products, and prices. For example, when the users B1, B2, and B3 who wish to go "Sing" are matched as the same sub-group, the server side can use the geographic location information of users B1, B2, and B3 as a basis to search for information on singing related service providers, such as KTV merchants that are close to the locations of users B1, B2, and B3, in a database that stores service provider data. The server side can send information (including address information, contact information, and product prices) on KTV merchants in the vicinity of users B1, B2, and B3 to the terminals of users B1, B2, and B3. For example, the server side can send information associated with a merchant that is within a threshold proximity of a user and that is relevant to the user (e.g., matches the business service attributes/predetermined feature identifiers included in the service message of the user).

In some embodiments, the server side can send a message sent by the terminal which was set up in the same sub-group as other terminals in said same sub-group. In some embodiments, the server side can send a list of terminals which were set up in the same sub-group as the terminals in the same sub-group. The server side can forward messages sent by terminals in the same sub-group to terminals in the same sub-group. In some embodiments, the server side provides a message exchange platform for users matched in the same sub-group. For example, users matched in the same sub-group can exchange messages via the server side. The list of the terminals can be a name list of users corresponding to different terminals of the same sub-group. In some embodiments, the list of terminals can be an identifier that can identify the different terminals of said same sub-group. For example, the terminals of users B1, B2, and B3 matched by the server side belong to the same sub-group. The server side can send a list of the names of users B1, B2, and B3 to the terminals of users B1, B2, and B3.

In some embodiments, the terminals send user-defined business service attributes as the user feature identifiers to the server side. The server side can use user-defined business service attributes as a basis for matching users with service requests that are the same or similar within a predetermined geographic service range and can also send user-related information for same or similar service requests to the appropriate message receiving terminals. Accordingly, the server side can share information on users with same or similar service requests and can avoid sending interfering information that is unrelated to user-requested service content. As a result, the accuracy of user matching and the user experience is improved.

Figure 4:
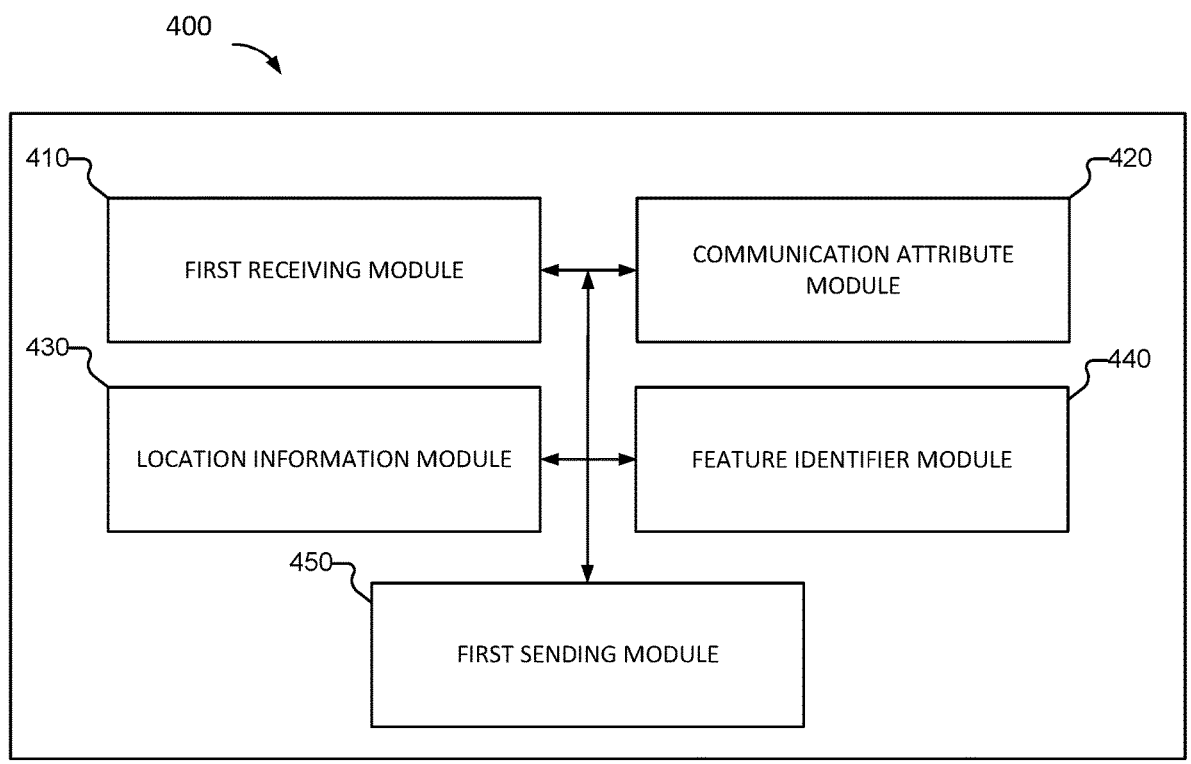
FIG. 4 is a structural diagram of a terminal according to various embodiments of the present application.

FIG. 4 is a modular structural diagram of a terminal according to various embodiments of the present application.

Referring to FIG. 4, a terminal 400 is provided. In some embodiments, terminal 400 is implemented in system 1300 of FIG. 13. Terminal 400 includes a first receiving module 410, a communication attribute module 420, a location information module 430, a feature identifier module 440, and a first sending module 450.

The first receiving module 410 is configured to receive the service messages sent from the server side. The service messages that the first receiving module 410 receives from the server side correspond to service messages that have geographic location information that is within a threshold range and that have extracted user feature identifiers that are the same, and that have a communication attribute (e.g., sending/receiving) that corresponds to "sending."

In some embodiments, the first receiving module 410 is configured to receive a list sent from the server side. The list received by the first receiving module 410 can include a list of terminals corresponding to the service messages that are among the service messages that have geographic location information that is within a threshold range and that have extracted user feature identifiers that are the same, and that have communication attributes (e.g., sending/receiving attributes) that correspond to "sending."

The communication attribute module (e.g., sending/receiving attribute module) 420 is configured to acquire communication attributes (e.g., sending/receiving attributes) of service content. The communication attribute module 420 can acquire the communication attributes from the user. For example, terminal 400 can provide an interface via which a user can input a desired communication attribute of service content. In some embodiments, the desired communication attribute of service content can be determined according to an application executed by terminal 400.

The location information module 430 can acquire geographic location information of terminal 400. For example, the location information can be acquired by a GPS positioning module. As another example, the location information module 430 can acquire the geographic location information via the mobile communication networks of telecom mobile operators. A server associated with the mobile communication network can provide terminal 400 (e.g., location information module 430) with the geographic location information of terminal 400 based on a communication between the terminal and a network device such as based on a signal strength between terminal 400 and the network device, or another similar method for determining a location of a terminal. The geographic location information of terminal 400 can also be acquired in combination with WiFi hotspot information. In response to the location information module 430 acquiring the geographic location information, terminal 400 can insert the geographic location information in a service message and send the service message (e.g., to the LBS server).

The feature identifier module 440 is configured to acquire user feature identifiers input by a user. For example, terminal 400 can provide an interface via which a user can input a user feature identifier. The user feature identifier can be configured to be specifically used in connection with an LBS service.

The first sending module 450 is configured to send service messages to the server side. The service messages include communication attributes (e.g., sending/receiving attributes), geographic location information (e.g., associated with the location of terminal 400), and user feature identifiers.

Figure 5:
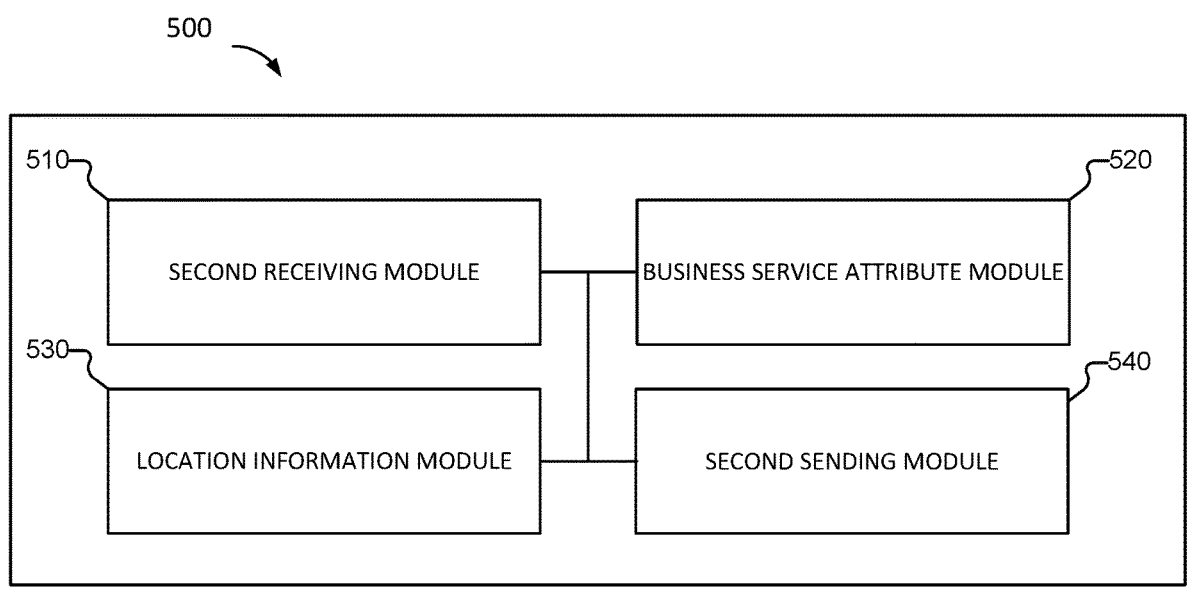
FIG. 5 is a structural diagram of a terminal according to various embodiments of the present application.

FIG. 5 is a structural diagram of a terminal according to various embodiments of the present application.

Referring to FIG. 5, a terminal 500 is provided. In some embodiments, terminal 500 is implemented in system 1300 of FIG. 13. Terminal 500 includes a second receiving module 510, a business service attribute module 520, a location information module 530, and a second sending module 540.

The second receiving module 510 is configured to receive a list from the server side. The list can correspond to a list of terminals associated with an LBS service. For example, the list can provide a list of terminals that have geographic location information corresponding to a location of the terminal that is within a threshold range and that have extracted business service attributes that are the same.

In some embodiments, the second receiving module 510 is configured to receive messages from the server side. The messages received from the server side can be associated with messages that were sent to the server side by terminals that have geographic location information corresponding to a location of the respective terminal that is within a threshold range and that have extracted business service attributes that are the same as the business service attributes of the first terminal (e.g., of terminal 500).

The business service attribute module 520 is configured to acquire business service attributes of service content of a first terminal (e.g., terminal 500). A user can input the business service attributes of service content. For example, terminal 500 can provide an interface through which the user can input the business service attributes of the service content. In response to the user inputting the business service attributes of the service content, the business service attribute module 520 can acquire the business service attributes.

The location information module 530 can acquire geographic location information of terminal 500. For example, the location information can use a GPS positioning module. As another example, the location information module 530 can acquire the geographic location information via the mobile communication networks of telecom mobile operators. A server associated with the mobile communication network can provide terminal 500 (e.g., location information module 530) with the geographic location information of terminal 500 based on a communication between the terminal and a network device such as based on a signal strength between terminal 500 and the network device, or another similar method for determining a location of a terminal. The geographic location information of terminal 500 can also be acquired in combination with WiFi hotspot information. In response to the location information module 530 acquiring the geographic location information, terminal 500 can insert the geographic location information in a service message and send the service message (e.g., to the LBS server).

The second sending module 540 is configured to send a first service message. The second sending module 540 can send the first service message to the server side. The first service message can include the business service attributes and geographic location information of the first terminal (e.g., terminal 500).

The business service attributes can be user-defined business service attributes acquired by a terminal.

Figure 6:
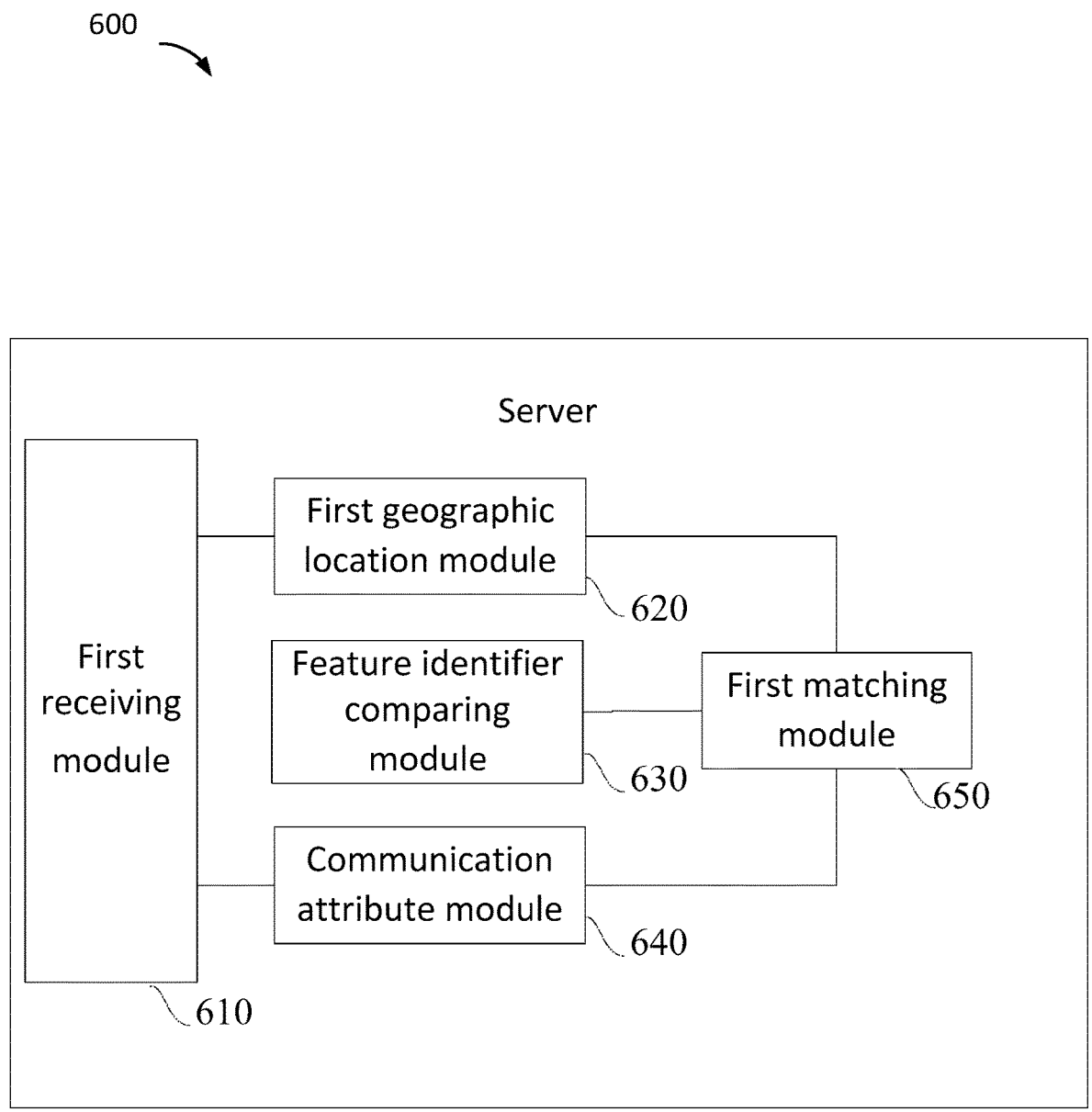
FIG. 6 is a structural diagram of an LBS-based user matching server according to various embodiments of the present application.

FIG. 6 is a structural diagram of an LBS-based user matching server according to various embodiments of the present application.

Referring to FIG. 6, a server 600 is provided. Server 600 can implement process 200 of FIG. 2A. In some embodiments, server 600 is implemented by system 1300 of FIG. 13. Server 600 includes a first receiving module 610, a first geographic location module 620, a feature identifier comparing module 630, a communication attribute module 640, and a first matching module 650.

The first receiving module 610 is configured to receive service messages. The first receiving module 610 can receive service messages from various different terminals.

The first geographic location module 620 is configured to extract geographic location information from received service messages and to determine whether terminals are within a threshold range (of each other) based at least in part on the geographic location information.

The feature identifier comparing module 630 is configured to extract user feature identifiers from received service messages and to compare the extracted user feature identifiers to determine whether the user feature identifiers are the same.

The communication attribute module (e.g., sending/receiving attribute module) 640 is configured to extract communication attributes (e.g., sending/receiving attributes) from received service messages.

The first matching module 650 is configured to match terminals. The first matching module 650 can classify, as message receiving terminals, the terminals corresponding to those service messages that are among the service messages that have geographic location information that is within a threshold range and that have extracted user feature identifiers that are the same, and that have communication attributes (e.g., sending/receiving attributes) that correspond to "receiving." The first matching module 650 can group terminals according to whether the terminals are within a threshold range and whether the terminals are associated with service messages that have the same use feature identifiers.

Figure 7:
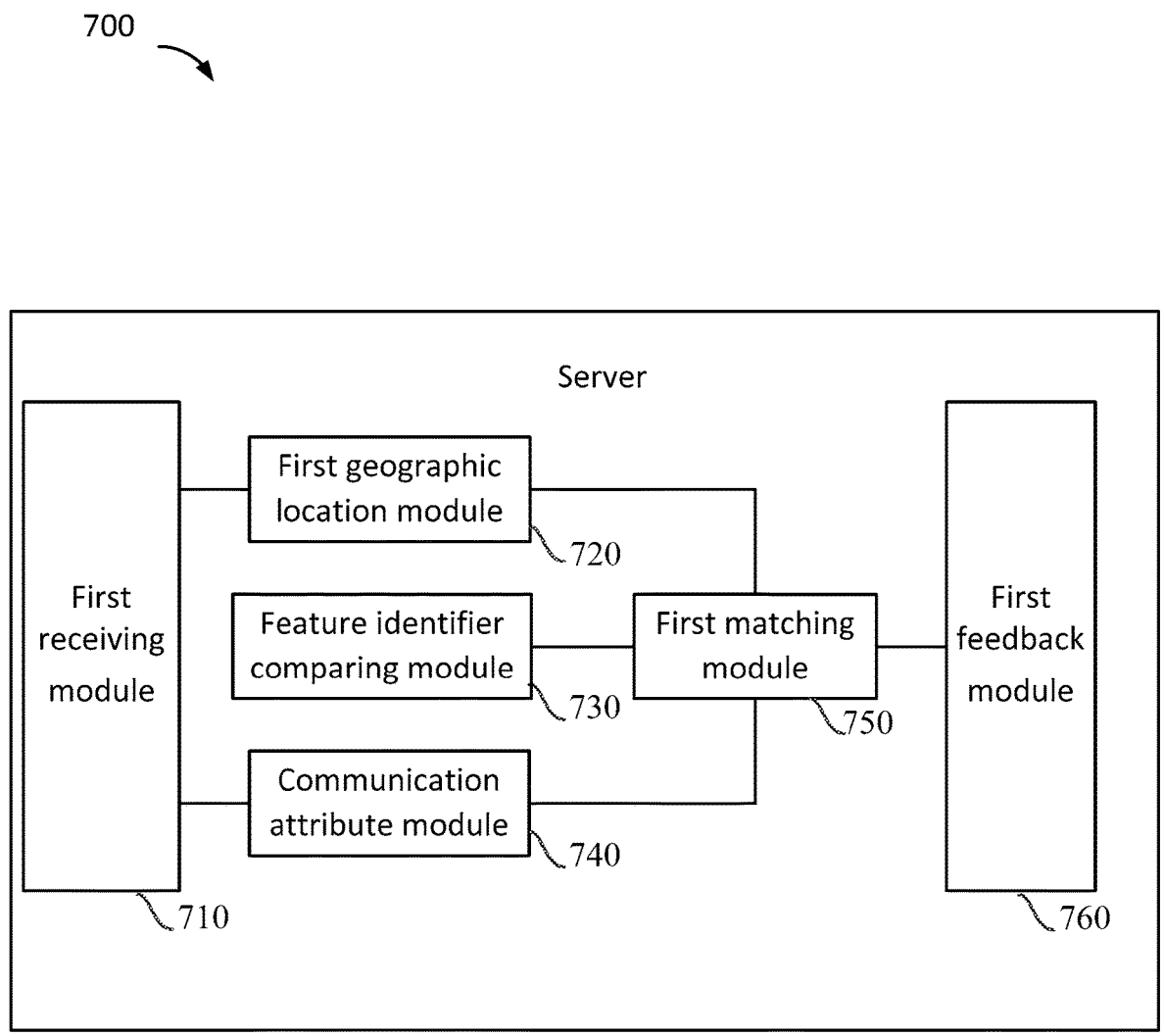
FIG. 7 is a structural diagram of an LBS-based user matching server according to various embodiments of the present application.

FIG. 7 is a structural diagram of an LBS-based user matching server according to various embodiments of the present application.

Referring to FIG. 7, a server 700 is provided. Server 700 can implement process 200 of FIG. 2A. In some embodiments, server 700 is implemented by system 1300 of FIG. 13. Server 700 includes a first receiving module 710, a first geographic location module 720, a feature identifier comparing module 730, a communication attribute module 740, a first matching module 750, and a first feedback module 760.

The first receiving module 710 can correspond to the first receiving module 610 of FIG. 6.

The first geographic location module 720 can correspond to the first geographic location module 620 of FIG. 6.

The feature identifier comparing module 730 can correspond to the feature identifier comparing module 630 of FIG. 6.

The communication attribute module 740 can correspond to the communication attribute module 640 of FIG. 6.

The first matching module 750 can correspond to the first matching module 650 of FIG. 6.

The first feedback unit module 760 is configured to send the service messages that are among the service messages that have geographic location information that is within a threshold range and that are associated with extracted user feature identifiers that are the same, and have communication attributes (e.g., sending/receiving attributes) that correspond to "sending." The first feedback module 760 can send the service messages to a terminal associated with service messages that have a communication attribute that corresponds to "receiving."

In some embodiments, the first feedback module 760 is configured to send a list of terminals corresponding to the service messages that are among the service messages that have geographic location information that is within a threshold range and that are associated with extracted user feature identifiers that are the same, and that have communication attributes (e.g., sending/receiving attributes) that correspond to "sending." The first feedback module 760 can send the list of terminals to a terminal associated with service messages that have a communication attribute that corresponds to "receiving."

Figure 8:
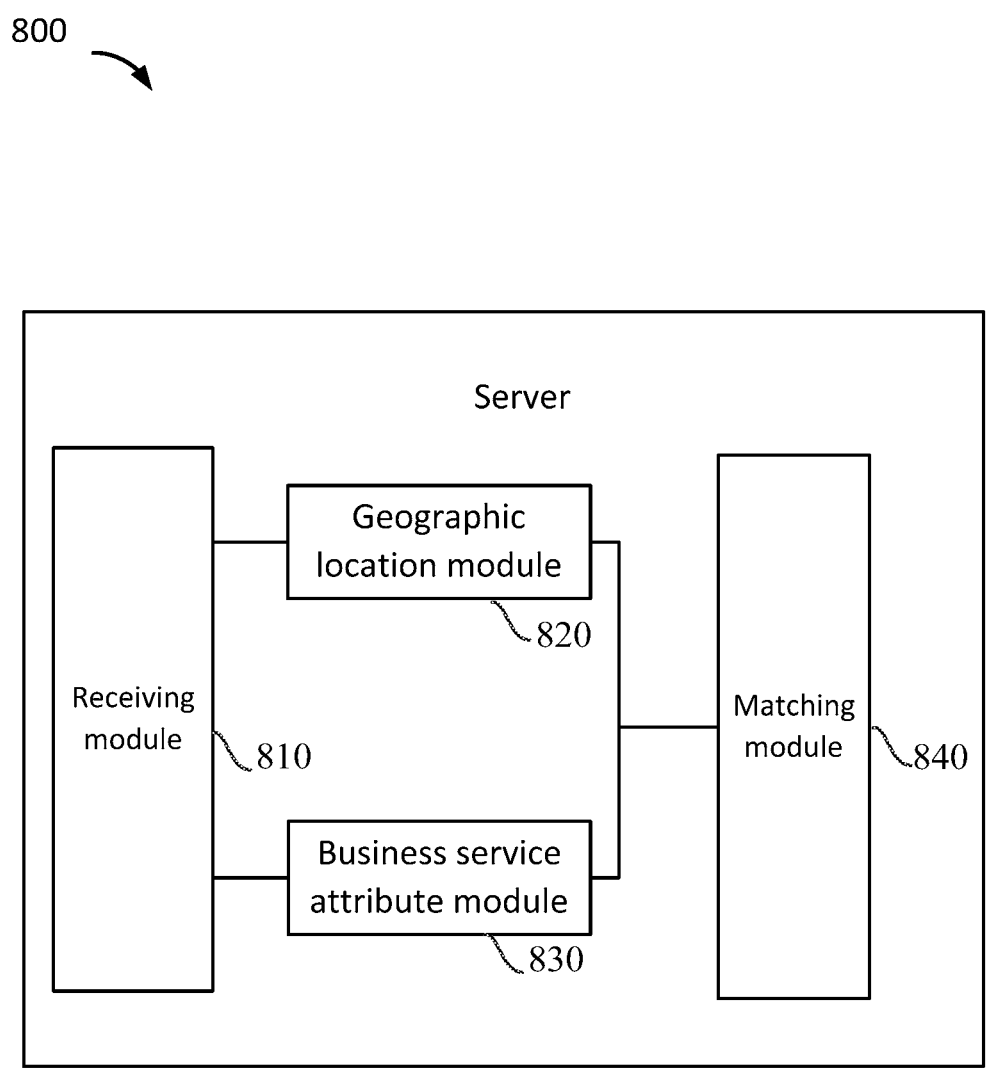
FIG. 8 is a structural diagram of an LBS-based user matching server according to various embodiments of the present application.

FIG. 8 is a structural diagram of an LBS-based user matching server according to various embodiments of the present application.

Referring to FIG. 8, a server 800 is provided. Server 800 can implement process 200 of FIG. 2A. In some embodiments, server 800 is implemented by system 1300 of FIG. 13. Server 800 includes a receiving module 810, a geographic location module 820, a business service attribute module 830, and a matching module 840.

The receiving module 810 is configured to receive service messages that were sent by different terminals. The service messages can include business service attributes and geographic location information. The receiving module 810 can receive the service messages in connection with providing an LBS service to various terminals.

The geographic location module 820 is configured to extract geographic location information associated with terminals from the service messages that were sent by the different terminals. For example, in response to the receiving module 810 receiving the service messages, the geographic location module 820 can extract the geographic location information included in the corresponding service messages. The geographic location module 820 can be further configured to determine whether geographic locations associated with the different terminals are within a threshold range based at least in part on the extracted geographic location information.

The business service attribute module 830 is configured to extract business service attributes associated with terminals from service messages that were sent by the different terminals. For example, in response to the receiving module 810 receiving the service messages, the business service attribute module 830 can extract the business service attributes included in the corresponding service messages. The business service attribute module 830 can be further configured to compare the business service attributes extracted from the service messages associated with the different terminals to determine whether the business service attributes are the same.

The matching module 840 is configured to configure sub-groups of terminals according to geographic locations associated with the terminals and according to the business service attributes. For example, the matching module 840 can be configured to configure a sub-group to include terminals associated with service messages having geographic locations that are within a threshold range and that have business service attributes that are the same.

In an LBS-based server such as server 800, the business service attributes extracted from the received first service message and the second service message by the business service attribute module 830 can be user-defined business service attributes.

Figure 9:
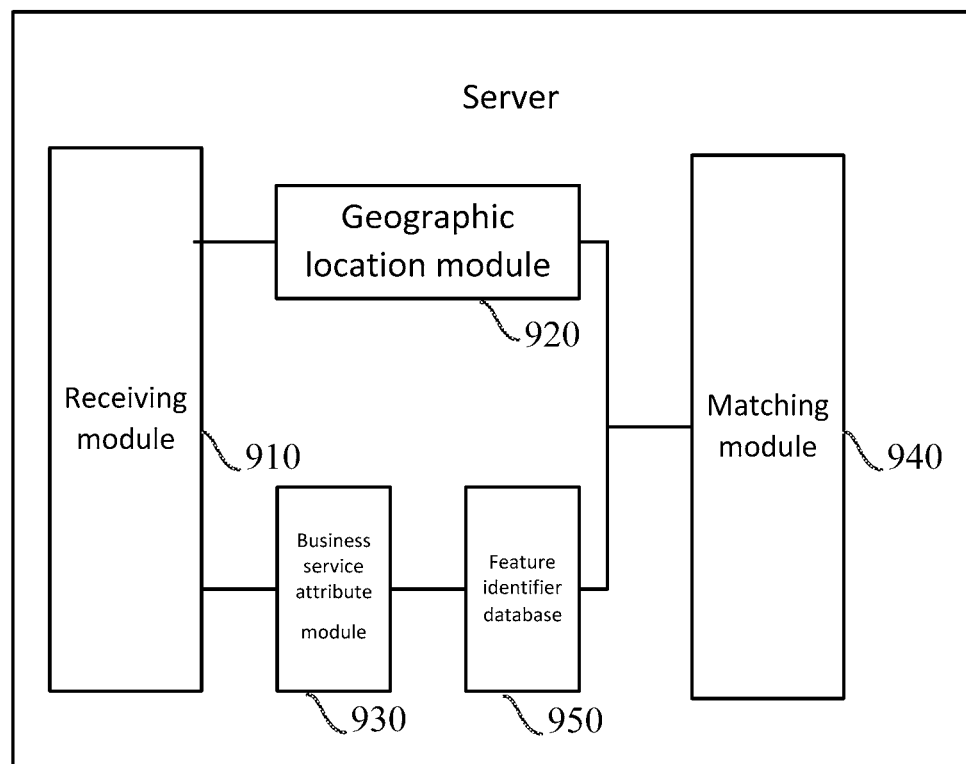
FIG. 9 is a structural diagram of an LBS-based user matching server according to various embodiments of the present application.

FIG. 9 is a structural diagram of an LBS-based user matching server according to various embodiments of the present application.

Referring to FIG. 9, a server 900 is provided. Server 900 can implement process 200 of FIG. 2A. In some embodiments, server 900 is implemented by system 1300 of FIG. 13. Server 900 includes a receiving module 910, a geographic location module 920, a business service attribute module 930, a matching module 940, and a feature identifier database 950.

The receiving module 910 can correspond to receiving module 810 of FIG. 8.

The geographic location module 920 can correspond to the geographic location module 820 of FIG. 8.

The business service attribute module 930 can correspond to the business service attribute module 830 of FIG. 8.

The matching module 940 can correspond to the matching module 840 of FIG. 8.

The feature identifier database 950 stores a mapping of user-defined business service attributes to predetermined feature identifiers.

In some embodiments, the business service attribute module 930 is further configured to compare the business service attributes of the different terminals to determine whether the business service attributes of the different terminals are the same. The business service attribute module 930 can query the database 950 to obtain predetermined feature identifiers corresponding to the extracted business service attributes of different terminals. The business service attribute module 930 can then compare the predetermined feature identifiers of the different terminals to determine whether the predetermined feature identifiers are the same.

The matching module 940 is configured to configure sub-groups of terminals according to geographic locations associated with the terminals and according to the predetermined feature identifiers. For example, the matching module 940 can be configured to configure a sub-group to include terminals associated with service messages having geographic locations that are within a threshold range and that have predetermined feature identifiers that are the same.

Figure 10:
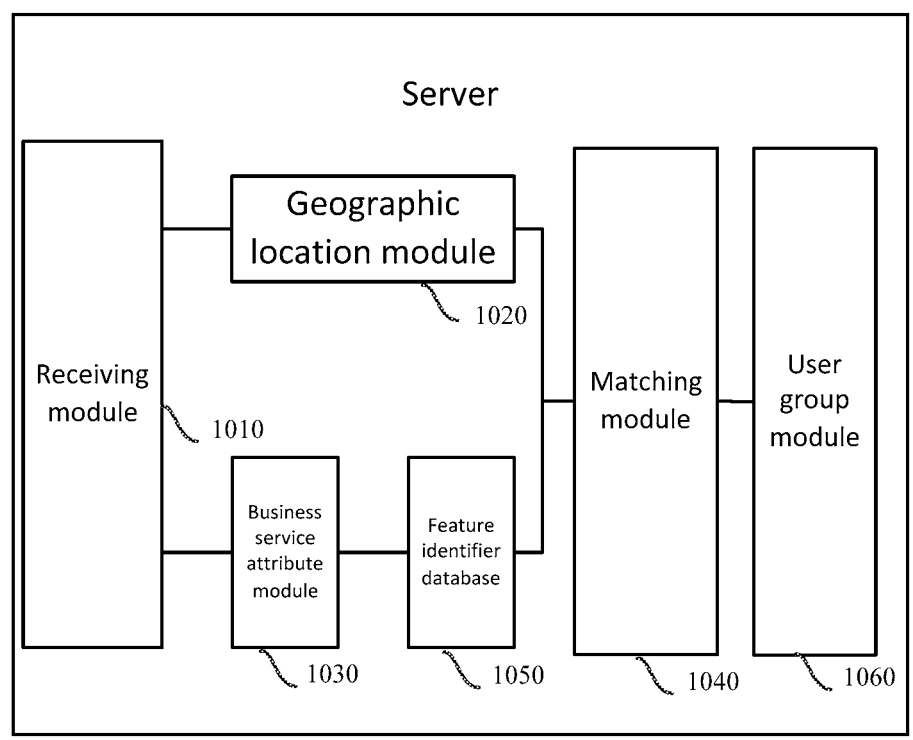
FIG. 10 is a structural diagram of an LBS-based user matching server according to various embodiments of the present application.

FIG. 10 is a structural diagram of an LBS-based user matching server according to various embodiments of the present application.

Referring to FIG. 10, a server 1000 is provided. Server 1000 can implement process 200 of FIG. 2A. In some embodiments, server 1000 is implemented by system 1300 of FIG. 13. Server 1000 includes a receiving module 1010, a geographic location module 1020, a business service attribute module 1030, a matching module 1040, a feature identifier database 1050, and a user group module 1060.

The receiving module 1010 can correspond to receiving module 810 of FIG. 8.

The geographic location module 1020 can correspond to the geographic location module 820 of FIG. 8.

The business service attribute module 1030 can correspond to the business service attribute module 830 of FIG. 8.

The matching module 1040 can correspond to the matching module 840 of FIG. 8.

The feature identifier database 1050 can correspond to the feature identifier database 950 of FIG. 9.

The user group module 1060 is configured to configure a user group. For example, the user group module 1060 can configure a user group for the terminals of the same sub-group. The members of the user group can comprise the terminals in the same sub-group that was configured. The user group module 1060 can be further configured to send messages associated with messages sent by the terminals belonging to the same user group to terminals in said same user group.

Figure 11:
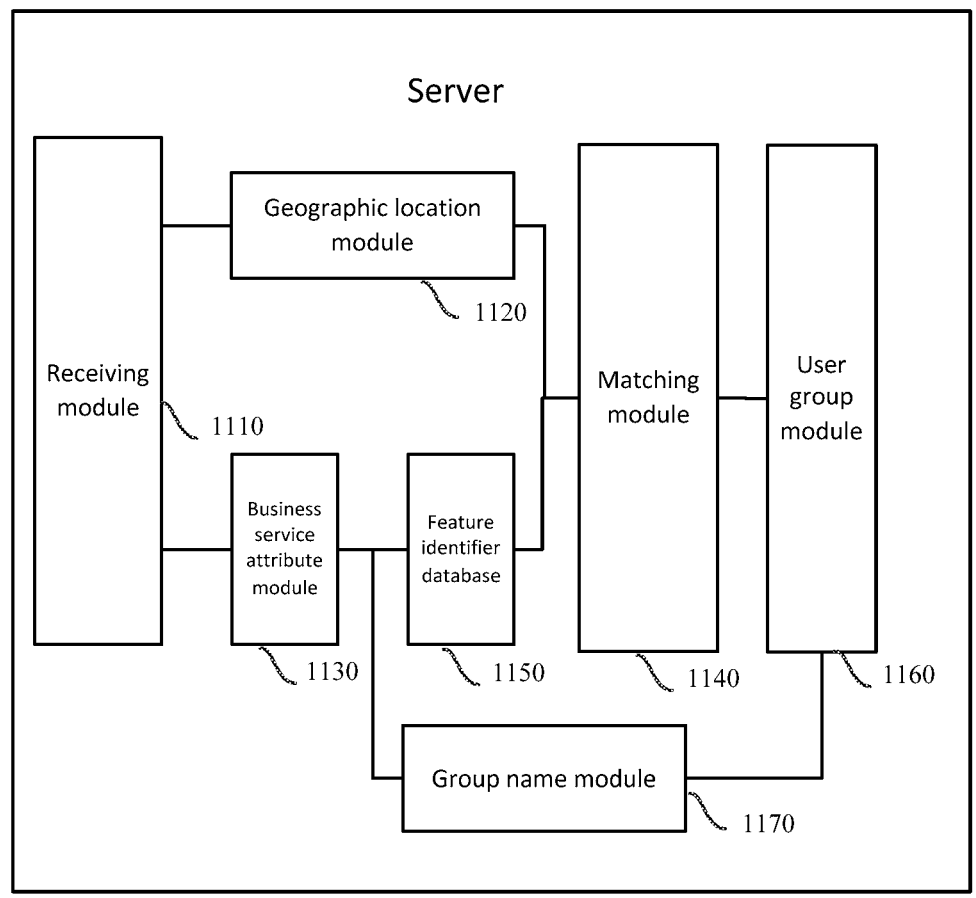
FIG. 11 is a structural diagram of an LBS-based user matching server according to various embodiments of the present application.

FIG. 11 is a structural diagram of an LBS-based user matching server according to various embodiments of the present application.

Referring to FIG. 11, a server 1100 is provided. Server 1100 can implement process 200 of FIG. 2A. In some embodiments, server 1100 is implemented by system 1300 of FIG. 13. Server 1100 includes a receiving module 1110, a geographic location module 1120, a business service attribute module 1130, a matching module 1140, a feature identifier database 1150, a user group module 1160, and a group name module 1170.

The receiving module 1110 can correspond to receiving module 810 of FIG. 8.

The geographic location module 1120 can correspond to the geographic location module 820 of FIG. 8.

The business service attribute module 1130 can correspond to the business service attribute module 830 of FIG. 8.

The matching module 1140 can correspond to the matching module 840 of FIG. 8.

The feature identifier database 1150 can correspond to the feature identifier database 950 of FIG. 9.

The user group module 1160 can correspond to the user group module 1060 of FIG. 10.

The group name module 1170 can determine a group name of a user group. The group name module 1170 can use the business service attributes in the service messages or the predetermined feature identifiers stored in the feature identifier database to determine the group name of the user group.

Figure 12:
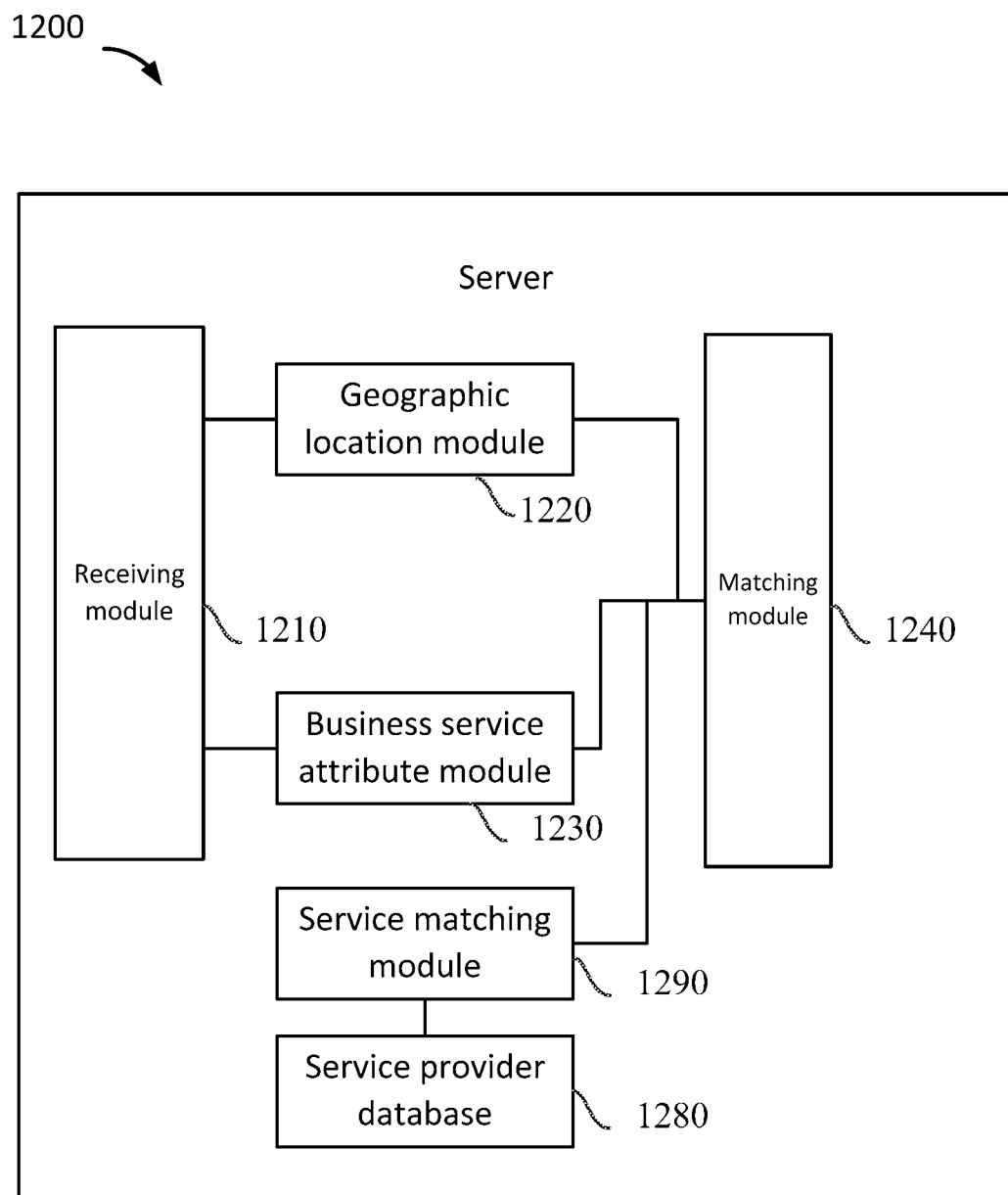
FIG. 12 is a structural diagram of an LBS-based user matching server according to various embodiments of the present application.

FIG. 12 is a structural diagram of an LBS-based user matching server according to various embodiments of the present application.

Referring to FIG. 12, a server 1200 is provided. Server 1200 can implement process 200 of FIG. 2A. In some embodiments, server 1200 is implemented by system 1300 of FIG. 13. Server 1200 includes a receiving module 1210, a geographic location module 1220, a business service attribute module 1230, a matching module 1240, a service provider database 1280, and a service matching module 1290.

The receiving module 1210 can correspond to receiving module 810 of FIG. 8.

The geographic location module 1220 can correspond to the geographic location module 820 of FIG. 8.

The business service attribute module 1230 can correspond to the business service attribute module 830 of FIG. 8.

The matching module 1240 can correspond to the matching module 840 of FIG. 8.

The service provider database 1280 can store information on service providers. The information on service providers can include address information, contact information, a list of provided services or products, prices, or the like.

The service matching module 1290 is configured to determine information on service providers corresponding to the different terminals and to provide the information on the service providers to the corresponding terminals. For example, the service matching module 1290 can use the geographic location information and business service attributes corresponding to different terminals of the same sub-group or use the geographic location information and predetermined feature codes corresponding to the different terminals of the same sub-group as a basis for determining information on service providers corresponding to the different terminals in the service provider database 1280. The service matching module 1290 can query the service provider database 1280 for information on a service provider based on information included in messages received from various terminals.

In some embodiments, server 1200 includes a list returning module (not shown). The list returning module can be configured to send a list of the terminals that belong to the same sub-group back to the terminals belonging to the same sub-group. For example, the list returning module can provide an indication to a terminal belonging to a sub-group of the other terminals that belong to the same sub-group. The list of the terminals can be an identifier list of the terminals, or the list can be a list of messages sent by the terminals.

Figure 13:
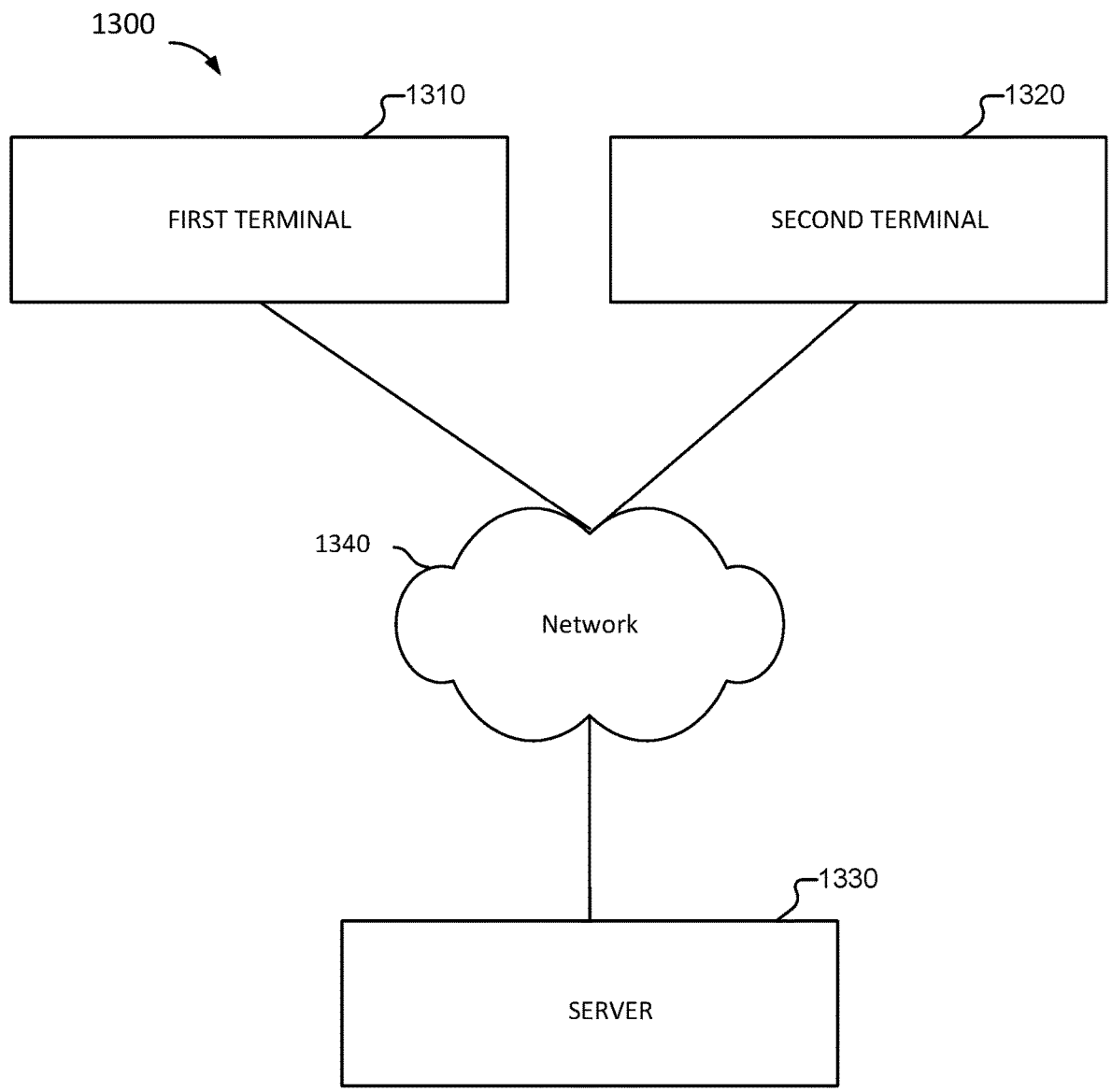
FIG. 13 is a structural diagram of an LBS-based user matching system according to various embodiments of the present application.

FIG. 13 is a structural diagram of an LBS-based user matching system according to various embodiments of the present application.

Referring to FIG. 13, a system for LBS-based user matching is provided. System 1300 can implement process 200 of FIG. 2A, or process 230 of FIG. 2B. System 1300 includes a first terminal 1310, a second terminal 1320, and a server 1330. System 1300 can further include a network 1340.

The first terminal 1310 or second terminal 1320 can be configured to acquire communication attributes (e.g., sending/receiving attributes) of service content. The first terminal 1310 or second terminal 1320 can acquire geographic location information corresponding to a location of the first terminal 1310 or second terminal 1320. The first terminal 1310 or second terminal 1320 can also acquire user feature identifiers. The user feature identifiers can be input to the first terminal 1310 or second terminal 1320 by users. The first terminal 1310 or second terminal 1320 sends service messages to the server 1330. The service message can include the communication attributes (e.g., the sending/receiving attributes), the geographic location information (e.g., corresponding to a location of the first terminal 1310 or second terminal 1320), and the user feature identifiers.

The server 1330 receives service messages from the first terminal 1310 or the second terminal 1320. In response to receiving a service message, the server 1330 extracts communication attributes (e.g., sending/receiving attributes), geographic location information, and user feature identifiers from the received service message. The server 1330 classifies terminals corresponding to those service messages that are among the service messages that have geographic location information that is within a threshold range and that correspond to the extracted user feature identifiers that are the same, and that have communication attributes (e.g., sending/receiving attributes) that correspond to "receiving" as message receiving terminals. The server 1330 sends information relating to the message receiving terminals to the message receiving terminals. For example, the server 1330 can send the information relating to the message receiving terminals based on the service requests corresponding to the terminals.

In some embodiments, the first terminal 1310 and the second terminal 1320 send service messages to the server 1330. The first terminal 1310 and the second terminal 1320 can send the service messages to the server 1330 over the network 1340. The service messages can include business service attributes and geographic location information of the terminals corresponding to the service messages.

The server 1330 receives service messages from the first terminal 1310 or the second terminal 1320. In response to receiving a service message, the server 1330 extracts the business service attributes and geographic location information of the terminals corresponding to the service messages from service messages sent by the different terminals (e.g., the first terminal 1310 and the second terminal 1320). The server 1330 configures a sub-group of terminals. For example, the server 1330 configures a sub-group of terminals such that terminals associated with geographic locations that are within a threshold range and that are associated with service messages that have business service attributes that are the same are included in the same sub-group.

The user feature identifiers can be sent in the service messages that may be sent by the terminals. The server can classify the received service messages according to the user feature identifiers, such that the server can differentiate terminals associated with different user groups. The server can match the appropriate terminals within the classified user group and avoid information interference from other user groups. Because the server can differentiate different user groups according to user feature identifiers in service messages, the accuracy of user matching at the LBS server side is enhanced.

Transmission between terminals and the server can use communication protocols, such as IP, TCP, UDP, Sockets, or HTTP, that comply with computer networks, or can use a communication implementation such as GSM or CDMA in a mobile communications network. Various other protocols or communication implementations can be used.

Figure 14:
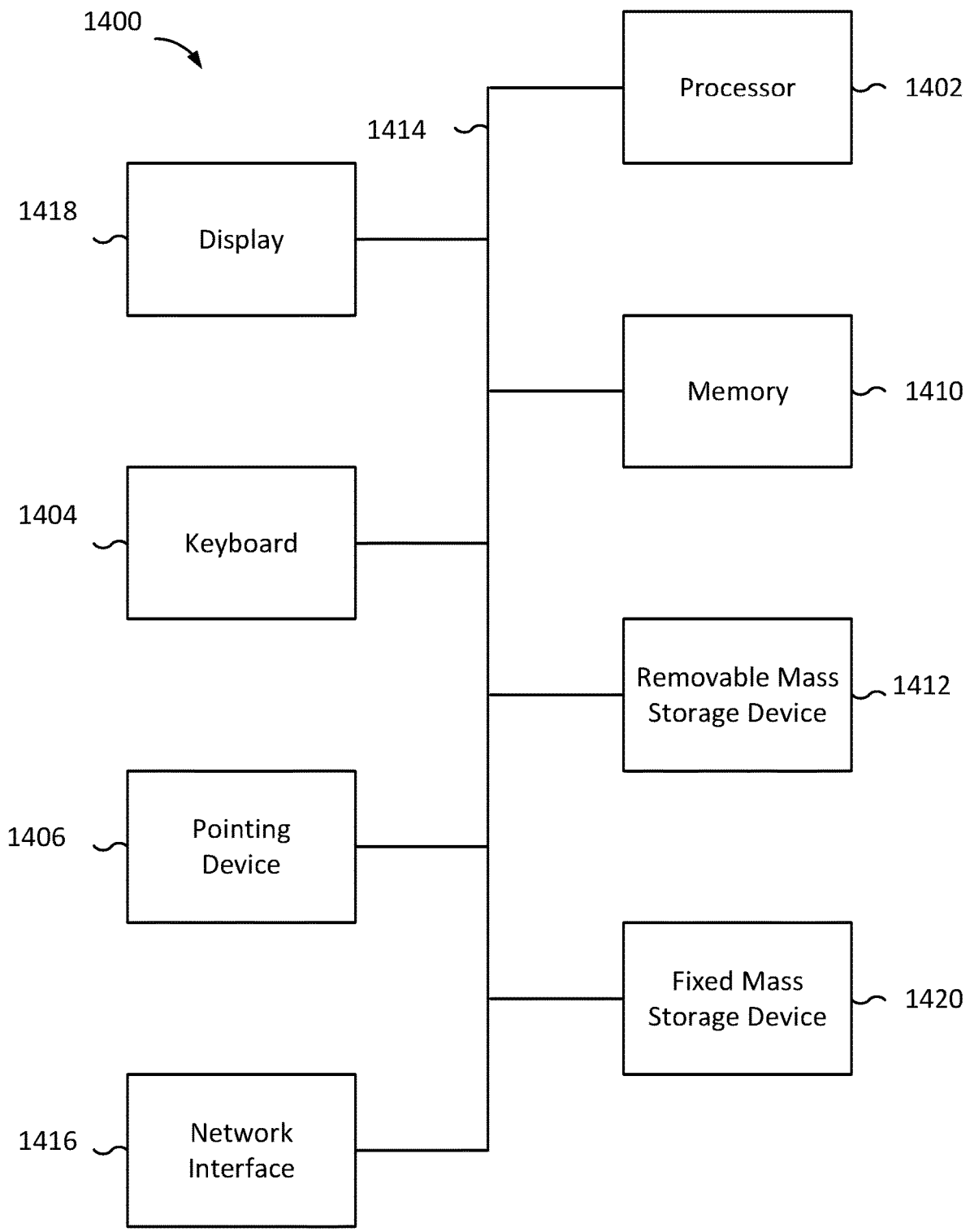
FIG. 14 is a functional diagram of a computer system for LBS-based user matching according to various embodiments of the present application.

FIG. 14 is a functional diagram of a computer system for LBS-based user matching according to various embodiments of the present application.

Referring to FIG. 14, a computer system 1400 for LBS-based user matching is provided. As will be apparent, other computer system architectures and configurations can be used to implement LBS-based user matching. Computer system 1400, which includes various subsystems as described below, includes at least one microprocessor subsystem (also referred to as a processor or a central processing unit (CPU)) 1402. For example, processor 1402 can be implemented by a single-chip processor or by multiple processors. In some embodiments, processor 1402 is a general purpose digital processor that controls the operation of the computer system 1400. Using instructions retrieved from memory 1410, the processor 1402 controls the reception and manipulation of input data, and the output and display of data on output devices (e.g., display 1418).

Processor 1402 is coupled bi-directionally with memory 1410, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1402. Also as is well known in the art, primary storage typically includes basic operating instructions, program code, data, and objects used by the processor 1402 to perform its functions (e.g., programmed instructions). For example, memory 1410 can include any suitable computer-readable storage media, described below, depending on whether, for example, data access needs to be bi-directional or uni-directional. For example, processor 1402 can also directly and very rapidly retrieve and store frequently needed data in a cache memory (not shown). The memory can be a non-transitory computer-readable storage medium.

A removable mass storage device 1412 provides additional data storage capacity for the computer system 1400, and is coupled either bi-directionally (read/write) or uni-directionally (read only) to processor 1402. For example, storage 1412 can also include computer-readable media such as magnetic tape, flash memory, PC-CARDS, portable mass storage devices, holographic storage devices, and other storage devices. A fixed mass storage 1420 can also, for example, provide additional data storage capacity. The most common example of mass storage 1420 is a hard disk drive. Mass storage device 1412 and fixed mass storage 1420 generally store additional programming instructions, data, and the like that typically are not in active use by the processor 1402. It will be appreciated that the information retained within mass storage device 1412 and fixed mass storage 1420 can be incorporated, if needed, in standard fashion as part of memory 1410 (e.g., RAM) as virtual memory.

In addition to providing processor 1402 access to storage subsystems, bus 1414 can also be used to provide access to other subsystems and devices. As shown, these can include a display monitor 1418, a network interface 1416, a keyboard 1404, and a pointing device 1406, as well as an auxiliary input/output device interface, a sound card, speakers, and other subsystems as needed. For example, the pointing device 1406 can be a mouse, stylus, track ball, or tablet, and is useful for interacting with a graphical user interface.

The network interface 1416 allows processor 1402 to be coupled to another computer, computer network, or telecommunications network using a network connection as shown. For example, through the network interface 1416, the processor 1402 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1402 can be used to connect the computer system 1400 to an external network and transfer data according to standard protocols. For example, various process embodiments disclosed herein can be executed on processor 1402, or can be performed across a network such as the Internet, intranet networks, or local area networks, in conjunction with a remote processor that shares a portion of the processing. Additional mass storage devices (not shown) can also be connected to processor 1402 through network interface 1416.

An auxiliary I/O device interface (not shown) can be used in conjunction with computer system 1400. The auxiliary I/O device interface can include general and customized interfaces that allow the processor 1402 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 14 is but an example of a computer system suitable for use with the various embodiments disclosed herein. Other computer systems suitable for such use can include additional or fewer subsystems. In addition, bus 1414 is illustrative of any interconnection scheme serving to link the subsystems. Other computer architectures having different configurations of subsystems can also be utilized.

Although the present application has been portrayed through embodiments, persons with ordinary skill in the art know that the present application has many variants and variations that do not depart from the spirit of the present application. It is hoped that the attached claims include these variants and variations without departing from the spirit of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a plurality of service messages from a plurality of terminals, the plurality of service messages being associated with one or more transactions and respectively comprising an attribute corresponding to at least one transaction of the one or more transactions; and
matching a set of terminals with respect to the at least one transaction based at least in part on a determination that the set of terminals are within a threshold distance of each other and on a determination that the attributes comprised in the service messages of the set of terminals correspond to each other, wherein the attributes included in the service message of at least one terminal of the set of terminals comprises an indication of a role of the at least one terminal with respect to the at least one transaction.

2. The method of claim 1, wherein the determination that the attributes comprised in the service messages of the set of terminals correspond to each other is based at least in part on determining that an indication of the service that a first terminal is requesting to receive matches an indication of the service that a second terminal is requesting to receive.

3. The method of claim 1, wherein the receiving of the service messages comprises:
receiving a first service message from a first terminal, wherein the first service message comprises an indication of a first transaction to be transacted with the first terminal, and an indication of a role of the first terminal with respect to at least one of the one or more transactions; and
receiving a second service message from a second terminal, wherein the second service message comprises an indication of a second transaction to be transacted with the second terminal, and an indication of a role of the second terminal with respect to at least one of the one or more transactions.

4. The method of claim 3, wherein the plurality of service messages include communication attributes, geographic location information, and user feature identifiers, wherein the user feature identifier corresponding to the first service message comprises the indication of the first transaction, and wherein the user feature identifier corresponding to the second service message comprises the indication of the second transaction.

5. The method of claim 4, wherein the first terminal and the second terminal are matched as two parties in connection with the same transaction based at least in part on the user feature identifiers respectively comprised in the first service message and the second service message.

6. The method of claim 3, wherein the matching the first terminal and the second terminal in connection with the same transaction comprises:
obtaining the communication attributes, the geographic location information, the first user feature identifier, and the second user feature identifier from the received service messages;
determining whether two or more of the plurality of terminals are within a threshold range of each other;
determining whether the extracted first user feature identifier and the second user feature identifiers corresponding to the two or more of the plurality of terminals are the same; and
in response to determining that the two or more of the plurality of terminals are within the threshold range and the corresponding obtained user feature identifiers match, setting a terminal of the one or more of the plurality of terminals as a message receiving terminal if a service message associated with the terminal includes a communication attribute corresponding to receiving.

7. The method of claim 6, wherein the user feature identifiers identify the one or more transactions.

8. The method of claim 6, further comprising:
sending, to the message receiving terminal, one or more service messages which, among service messages that have geographic location information that is within the threshold range and that correspond to extracted user feature identifiers that are the same, have one or more corresponding communication attributes that correspond to sending; or
sending, to the message receiving terminal, a list of one or more sending terminals corresponding to those service messages among the service messages that have geographic location information that is within the threshold range, that include the same user feature identifiers, and that have communication attributes that correspond to sending.

9. The method of claim 3, wherein at least one of the one or more transactions identified by the user feature identifiers is transacted between two or more of the plurality of terminals.

10. The method of claim 3, wherein the first terminal and the second terminal are matched as two parties in connection with the same transaction based at least in part on the indication of the first transaction comprised in the first service message and the indication of the second transaction comprised in the second service message.

11. The method of claim 3, further comprising:
in response to matching the first terminal and the second terminal as two parties in connection with the same transaction, providing an indication of the matching to the second terminal.

12. The method of claim 3, further comprising:
in response to matching the first terminal and the second terminal as two parties in connection with the same transaction, providing an indication of the matching to the second terminal.

13. The method of claim 1, wherein:
the attributes comprised in the service messages corresponds to identifiers corresponding to at least one of the one or more transactions; and the matching the set of terminals as two parties in connection with the same transaction further comprises determining that the identifiers comprised it the corresponding service messages correspond to each other.

14. The method of claim 13, wherein the determining that the identifiers comprised it the corresponding service messages correspond to each other comprises:
determining that the service that the first terminal is requesting to receive corresponds to receiving a first payment in connection with the first transaction; and
determining that the service that the second terminal is requesting to receive corresponds to making a second payment in connection with the second transaction.

15. The method of claim 14, wherein the determining that the indication of the service that the first terminal is requesting to receive matches the indication of the service that the second terminal is requesting to receive comprises:
determining that the service that the first terminal is requesting to receive corresponds to receiving a first payment in connection with the first transaction; and
determining that the service that the second terminal is requesting to receive corresponds to making a second payment in connection with the second transaction.

16. The method of claim 13, wherein the determining that the identifiers comprised it the corresponding service messages correspond to each other comprises determining whether the first user feature identifier included in the first service message matches the second user feature identifier included in the second service message, and
wherein in response to determining that the first user feature identifier included in the first service message matches the second user feature identifier included in the second service message, the first terminal and the second terminal can be matched in relation to the transaction identified by the corresponding first service message and second service message.

17. A server, comprising:
at least one processor configured to:
receive a plurality of service messages from a plurality of terminals, the plurality of service messages being associated with one or more transactions and respectively comprising an attribute corresponding to at least one transaction of the one or more transactions; and
match a set of terminals with respect to the at least one transaction based at least in part on a determination that the set of terminals are within a threshold distance of each other and on a determination that the attributes comprised in the service messages of the set of terminals correspond to each other, wherein the attributes included in the service message of at least one terminal of the set of terminals comprises an indication of a role of the at least one terminal with respect to the at least one transaction; and
a memory coupled to the at least one processor and configured to provide the at least one processor with instructions.

18. A computer program product, the computer program product being embodied in a non-transitory computer readable storage medium and comprising computer instructions for:
receiving a plurality of service messages from a plurality of terminals, the plurality of service messages being associated with one or more transactions and respectively comprising an attribute corresponding to at least one transaction of the one or more transactions; and
matching a set of terminals with respect to the at least one transaction based at least in part on a determination that the set of terminals are within a threshold distance of each other and on a determination that the attributes comprised in the service messages of the set of terminals correspond to each other, wherein the attributes included in the service message of at least one terminal of the set of terminals comprises an indication of a role of the at least one terminal with respect to the at least one transaction.

* * * * *